US011205097B2

(12) United States Patent (10) Patent No.: US 11,205,097 B2
Masse et al. (45) Date of Patent: Dec. 21, 2021

(54) TRAINING ARTIFICIAL NEURAL NETWORKS USING CONTEXT-DEPENDENT GATING WITH WEIGHT STABILIZATION

(71) Applicant: The University of Chicago, Chicago, IL (US)

(72) Inventors: Nicolas Y. Masse, Chicago, IL (US); Gregory D. Grant, Chicago, IL (US); David J. Freedman, Chicago, IL (US)

(73) Assignee: THE UNIVERSITY OF CHICAGO, Chicago, IL (US)

(*) Notice: Subject to any disclaimer, the term of this patent is extended or adjusted under 35 U.S.C. 154(b) by 137 days.

(21) Appl. No.: 16/774,343

(22) Filed: Jan. 28, 2020

(65) Prior Publication Data

US 2020/0250483 A1 Aug. 6, 2020

Related U.S. Application Data

(60) Provisional application No. 62/800,167, filed on Feb. 1, 2019.

(51) Int. Cl.
*G06K 9/62* (2006.01)
*G06N 3/00* (2006.01)
*G06N 3/04* (2006.01)

(52) U.S. Cl.
CPC ......... *G06K 9/6257* (2013.01); *G06K 9/6228* (2013.01); *G06N 3/04* (2013.01)

(58) Field of Classification Search
CPC ....... G06K 9/6257; G06K 9/6228; G06N 3/04
See application file for complete search history.

(56) References Cited

PUBLICATIONS

Serra et al, "Overcoming Catastrophic Forgetting with Hard Attention to the Task", 2018, Proceedings of the 35 th International Conference on Machine Learning, Stockholm, Sweden, PMLR 80, 10 pages (Year: 2018).*
Aljundi et al, "Memory Aware Synapses: Learning what (not) to forget", 2018, Proceedings of the European Conference on Computer Vision (ECCV), 16 pages (Year: 2018).*
Abadi, M., et al., "Tensorflow: Large-scale machine learning on heterogeneous distributed systems," arXiv:1603.04467v2 (2016).
Aljundi, R., et al., "Memory aware synapses: Learning what (not) to forget," arXiv:1711.09601 (2017).

(Continued)

*Primary Examiner* — David F Dunphy
(74) *Attorney, Agent, or Firm* — McDonnell Boehnen Hulbert & Berghoff LLP

(57) ABSTRACT

A computing device may receive a first set of training data for training an ANN to predict output data for a first task, and may train the ANN with the first set of training data by only adjusting values of weights associated with a first subset of neurons, the first subset selected based on an identity of the first task. The computing device may receive a second, different set of training data for training the ANN to predict output data for a second task, and may train the ANN with the second set of training data by only adjusting values of weights associated with a second subset of neurons, the second subset selected based on an identity of the second task. During training, adjusting of the value of any weight may entail weight stabilization that depends on whether there has been any training for one or more previous tasks.

20 Claims, 14 Drawing Sheets

(56) References Cited

PUBLICATIONS

Barto, A. G., et al., "Neuronlike adaptive elements that can solve difficult learning control problems," IEEE Transactions on Systems, Man, and Cybernetics, vol. 13, No. 5, pp. 834-846 (1983).
Bassett, D. S., et al. "Dynamic reconfiguration of human brain networks during learning," PNAS, vol. 108, No. 18, pp. 7641-7646 (2011).
Cichon, J, et al., "Branch-specific dendritic Ca2+ spikes cause persistent synaptic plasticity," Nature, vol. 520, pp. 180-185 (2015).
Deng, J., et al., "Imagenet: A large-scale hierarchical image database," IEEE Conference on Computer Vision and Pattern Recognition (IEEE, Piscataway, NJ), pp. 248-255 (2009).
Engel, A. K., et al., "Dynamic predictions: Oscillations and synchrony in top-down processing," Nat Rev Neurosci vol. 2, pp. 704-716 (2001).
Fernando, C., et al., "PathNet: Evolution channels gradient descent in super neural networks," arXiv:1701.08734v1 (2017).
Fischer, M., et al., "Rapid actin-based plasticity in dendritic spines," Neuron, vol. 20, pp. 847-854 (1998).
Goodfellow, I. J., et al., "An empirical investigation of catastrophic forgetting in gradient-based neural networks," arXiv:1312.6211v3 (2013).
He, X., et al., "Overcoming catastrophic interference by conceptors," arXiv:1707.04853v2 (2017).
Hochreiter, S., et al., "Long short-term memory," Neural Computation, 9, 1735-1780 (1997).
Johnston, K., et al., "Top-down control-signal dynamics in anterior cingulate and prefrontal cortex neurons following task switching," Neuron, 53, 453-462 (2007).
Kasai, H., et al., "Structure-stability-function relationships of dendritic spines." TRENDS Neurosciences, vol. 26, No. 7, pp. 360-368 (2003).
Kingma, D. P., et al., Adam: A method for stochastic optimization, arXiv:1412. 6980v9 (2014).
Kirkpatrick, J., et al., "Overcoming catastrophic forgetting in neural networks," PNAS, vol. 114, No. 13, pp. 3521-3526 (2017).
Kuchibhotla, K. V., et al., "Parallel processing by cortical inhibition enables context-dependent behavior," Nature Neuroscience, vol. 20, No. 1, pp. 62-71 (2017).
Kukushkin, N. V., et al., "Memory takes time," Neuron, 95, pp. 259-279 (2017).
Lake, B. M., et al., "One-shot learning by inverting a compositional causal process," Advances in Neural Information Processing Systems, eds Burges CJC, Bottou L, Welling M, Ghahramani Z, Weinberger KQ (Curran Assoc, Red Hook, NY), pp. 2526-2534 (2013).

Li, Z., et al., "Learning without forgetting," IEEE Transactions on Pattern Analysis and Machine Intelligence, vol. 40, No. 12, (2018).
Mallya, A., et al., "Packnet: Adding multiple tasks to a single network by iterative pruning," arXiv:1711.05769 (2017).
Miller, E. K., et al., "An integrative theory of prefrontal cortex function," Annu Rev. Neurosci. 24:167-202 (2001).
Nguyen, C. V., et al., "Variational continual learning," arXiv:1710. 10628v3 (2018).
Otazu, G. H., et al., "Engaging in an auditory task suppresses responses in auditory cortex," Nature Neuroscience, vol. 12, pp. 646-654 (2009).
Rusu, A. A., et al., "Progressive neural networks," arXiv:1606. 04671v3 (2016).
Santoro, A, et al., "One-shot learning with memory-augmented neural networks," arXiv:1605.06065v1 (2016).
Schulman, J., et al., "High-dimensional continuous control using generalized advantage estimation," arXiv:1506.02438v6 (2018).
Serra, J., et al., "Overcoming catastrophic forgetting with hard attention to the task," arXiv:1801.01423v3 (2018).
Srivastava, N., et al., "Dropout: A simple way to prevent neural networks from overfitting," J Machine Learn Res 15:1929-1958 (2014).
Tononi, G., et al., "Sleep and the price of plasticity: From synaptic and cellular homeostasis to memory consolidation and integration," Neuron 81:12-34 (2014).
Velez, R., et al., "Diffusion-based neuromodulation can eliminate catastrophic forgetting in simple neural networks," arXiv:1705. 07241 (2017).
Xu, T., et al., "Rapid formation and selective stabilization of synapses for enduring motor memories," Nature vol. 462, pp. 915-919 (2009).
Yang, G, et al., "Stably maintained dendritic spines are associated with lifelong memories," Nature, vol. 462, pp. 920-924 (2009).
Yang, R. G., et al., "Clustering and compositionality of task representations in a neural network trained to perform many cognitive tasks," bioRxiv:183632. (2017).
Yoshihara, Y., et al., "Dendritic spine formation and stabilization," Current Opinion Neurobiology 19:146-153 (2009).
Yuste, R., et al., "Morphological changes in dendritic spines associated with long-term synaptic plasticity," Annu Rev Neurosci 24:1071-1089 (2001).
Zenke, F., et al., "Continual learning through synaptic intelligence," International Conference on Machine Learning (International Machine Learning Society, Princeton), pp. 3987-3995 (2017).

\* cited by examiner

| TASK | $H1_1$ | $H1_2$ | $H1_3$ | $H1_4$ | $H1_5$ | ... | $H1_L$ | $H2_1$ | $H2_2$ | $H2_3$ | $H2_4$ | $H2_5$ | ... | $H2_L$ |
|---|---|---|---|---|---|---|---|---|---|---|---|---|---|---|
| A | 1 | 0 | 1 | 0 | 1 | ... | 0 | 0 | 1 | 0 | 0 | 0 | ... | 1 |
| B | 0 | 1 | 0 | 0 | 0 | ... | 1 | 0 | 1 | 0 | 1 | 1 | ... | 0 |
| C | 1 | 1 | 0 | 0 | 1 | ... | 0 | 1 | 0 | 0 | 1 | 0 | ... | 0 |
| ... | ... | ... | ... | ... | ... | ... | ... | ... | ... | ... | ... | ... | ... | ... |
| Q | 0 | 0 | 1 | 1 | 0 | ... | 0 | 1 | 0 | 0 | 0 | 0 | ... | 1 |

NEURON

TRAINING ARTIFICIAL NEURAL NETWORKS USING CONTEXT-DEPENDENT GATING WITH WEIGHT STABILIZATION

CROSS-REFERENCE TO RELATED APPLICATIONS

This application claims priority to U.S. Provisional Patent Application No. 62/800,167, filed on Feb. 1, 2019, the which is incorporated herein in its entirety by reference.

STATEMENT REGARDING FEDERALLY SPONSORED RESEARCH

This invention was made with government support under grants EY019041 and MH092927 awarded by the National Institutes of Health, and grant NCS 1631571 awarded by the National Science Foundation. The government has certain rights in the invention.

BACKGROUND

Artificial neural networks (ANNs) may be used for a variety of machine learning (ML) and artificial intelligence (AI) tasks, such as image recognition or machine vision, speech recognition (e.g., speech-to-text), speech synthesis (e.g., text-to-speech), and pattern recognition, to name a few. In a typical scenario, an ANN may be "trained" to recognize features and/or characteristics of a class of input objects as represented in input data in order to later be able to receive previously unknown data, and in it identify (or rule out the identity of) particular objects of the class with some statistical certainty. For example an ANN may be trained to recognize cats in digital images, so that the ANN may later identify images of cats from among previously unseen (by the ANN) input images.

An ANN may be implemented as computer-executable instructions on a computing device (e.g., computer, smartphone, server, etc.). In a common arrangement, an ANN may include an array of neurons (e.g., as computational units), each of which may receive input data from one or more sources (e.g., input data, or other neurons), compute a mathematical function using the input data, and output the computational result to one or more other neurons, or as output data from the ANN. Neurons of an ANN may be configured in a multiplicity of ANN layers, and are typically interconnected one layer to the next from neuron outputs to neuron inputs. The mathematical function of each neuron generally includes one or more parameters that may be adjusted in order to "train" the ANN to perform a given task with a prescribed level of accuracy.

SUMMARY

Training usually involves providing the ANN with input "training data" that includes samples of known objects of a given class, and tuning or adjusting the parameters of the neurons' respective mathematical functions so that the ANN's predicted identifications match the known identifications of the objects to some degree of statistical certainty. In this approach, the samples of the known objects may serve as examples for the ANN. By training on a sufficient number and/or sufficient quality of samples, the ANN may thus learn, through adjustment of its parameters, to recognize objects of the given class. Later, at "runtime," the ANN may receive runtime input data—e.g., data that the ANN has not previously seen—and be able to determine to some statistical certainty if the runtime data includes or represents new (previously unobserved) examples of the given class. In the context of this example description, training the ANN on known objects from one or more classes may be considered to represent training the ANN for a particular "task," and training the same ANN on known objects from one or more other classes may be considered training the ANN for a different task. It will be appreciated that not all ANN tasks are necessarily ones of strictly recognition, or ones that produce an output result that answers a question of recognition.

It is possible for the same ANN to perform multiple, different tasks, provided the ANN can be trained for the different tasks. For example, in some instances, recognizing cats and dogs in digital images may be considered one task, while recognizing motorcycles and cars in digital images may be considered a different task. As another example, for an ANN-based language translation, translating text or speech from English to French may be considered one task, and translating text or speech from English to German may be considered a different task. A common ANN may also be used for more diverse tasks, such as recognition of diverse objects in images and recognition of speech in digital audio data. While some different tasks may share common aspects, such as recognition of types of objects in digital images, they may still be considered different at least to the extent that an ANN must be trained separately for each. Thus, in order to perform more than one, different task, an ANN needs to be trained for each different task. In this disclosure, two or more ANN tasks are considered different if the ANN needs to be trained separately for each of the two or more ANN tasks.

A significant challenge in training an ANN for multiple tasks is that, because each training may adjust the parameters of the ANN, successive task trainings may tend to change the parameter values determined from one or more previous task trainings. As a result, the ANN may tend to "forget" parameters from earlier task trainings, leading to degradation of runtime performance of the ANN on earlier-trained tasks. The larger the number of distinct tasks for which an ANN is sequentially trained, the worse the ANN performs for tasks trained earlier in the sequence of task trainings.

More specifically, as described below, a given neuron typically computes a mathematical function, referred to an "activation function," of its input data, then outputs the resulting activation function value. The output of a neuron in one layer of an ANN may be connected to the input of each of one or more neurons in the next layer, and the input of each neuron in one layer may be connected to the outputs of one or more neurons in the previous layer. Each connection may be associated with a respective weight, which may be applied to the output value when it is supplied to the input of the connected neuron. The input data of a given neuron may thus consist of multiple, weighted input values. The neuron sums the weighted input values together with a bias term, computes the activation function of the sum, and outputs the activation function to the next layer or as output from the ANN. It is the weights and biases of all the connections of the ANN that are adjusted or tuned during training. And because the weights and biases for one task may be different from those of another task, sequential training may change previously-determined values from earlier-trained tasks. This phenomenon is sometimes referred to as "catastrophic forgetting" in ANNs.

One attempted approach to reduce catastrophic forgetting in multi-task training of ANNs is to determine a computational importance of each weight to the performance of the ANN for a given task, and inhibit adjustment of weights during subsequent training in proportion to (or as a function of) the determined importance of the weights to the given task. This technique, referred to herein as "weight stabilization," an example of which is sometimes referred to in research contexts as "synaptic stabilization," has been shown empirically to reduce or alleviate catastrophic forgetting to a limited degree. In particular, after a relatively small number of sequential task trainings, the predictive (statistical) accuracy of the ANN for earlier-trained tasks was observed to fall off more slowly than sequential training without weight stabilization. The actual number may range from 10 to 10s or larger, depending on the complexity of the tasks and the size of the ANN. However, beyond the range of the observed slow drop in accuracy, significant performance degradation was still observed for many multiples of sequential task trainings, the actual number for this more severe degradation depending, again, on the complexity of the tasks and the size of the ANN.

The inventors have devised a novel approach to reduce catastrophic forgetting that selects different subsets of an ANN's neurons to be activated during training and runtime operations for different tasks. The neurons of each subset are selected randomly from among the neurons of the ANN (but generally exclude neurons of the input and output layers, as described below), and each subset is associated with a different one of multiple tasks for which the ANN is trained. Neurons that are activated for a given task function as usual, while those not in the subset for the given task are rendered inactive by "gating" their inputs or outputs. Thus, during training for a given task, only a subset of weights are subject to adjustment, while all the others—those of "gated" neurons—remain unchanged, thereby lessening the impact of subsequent training on previously-determined weights. In view of the association of each subset with a different one of multiple tasks or "contexts," this technique is referred to herein as "context-dependent gating."

The inventors have determined empirically that context-dependent gating by itself yields results similar to those of weight stabilization, with the predictive (statistical) accuracy of the ANN for earlier-trained tasks dropping more slowly than sequential training without context-dependent gating for a range of sequential task trainings similar to the range observed for weight stabilization. Again, further performance degradation was observed for multiples of sequential task trainings.

However, in an unexpected discovery, the inventors found that applying both context-dependent gating and weight stabilization during sequential training of multiple tasks yielded not only much higher accuracy of ANN prediction at runtime for all tasks (including the earlier-trained tasks) than either technique by itself, but also yielded a much slower drop-off in predictive accuracy of the ANN after many multiples of sequential trainings than either technique by itself. And the drop-off in accuracy appeared to slow down beyond the range that degradation set in. Thus, the inventors have discovered that when used together, context-dependent gating and weight stabilization provide complementary improvements to alleviating catastrophic forgetting in multi-task sequential ANN training that are significantly beyond any additive effect that might otherwise have been expected.

Accordingly, methods and systems are disclosed herein for applying both context-dependent gating and weight stabilization to sequentially training ANNs for multiple, different tasks. Example embodiments may be described in terms of feed-forward ANNs, though the techniques described herein are not limited or restricted only to such ANNs. Also by way of example, training and runtime operations may be described herein for image recognition tasks. However, it should be understood that these are just examples of the types of different tasks to which the techniques may be applied.

Thus, in one respect, example embodiments may involve a method, carried out by a computing device, for computationally training an artificial neural network (ANN) implemented in the computing device. The method may involve, at the computing device, receiving a first set of training data for training the ANN to predict output data for a first type of task. The method may further involve, at the computing device, training the ANN with the first set of training data by adjusting values of only those weights associated with a first subset of neurons of the ANN, where the first subset of neurons is selected based on an identity of the first type of task. The method may additionally involve, at the computing device, receiving a second set of training data for training the ANN to predict output data for a second type of task, where the second type of task is different from the first type of task. The method may also involve, at the computing device, training the ANN with the second set of training data by adjusting values of only those weights associated with a second subset of neurons of the ANN, where the second subset of neurons is selected based on an identity of the second type of task. Further, during training of the ANN for any given type of task, adjusting of the value of any given weight associated with neurons of the ANN may involve: if the ANN has been previously trained for one or more task types different from the given type, computationally biasing adjustment of the value of the given weight according to a respective importance of the given weight to a predictive capability of the ANN for the one or more task types, and if the ANN has not been previously trained for any task types different from the given type, computationally adjusting the value of the given weight without bias.

In another respect, example embodiments may involve a computing device. The computing device may include one or more processors and memory configured to store computer-executable instructions that, when executed by the one or more processors, cause the computing device to carry out operations. The operations may involve receiving a first set of training data for training an artificial neural network (ANN) implemented on the one or more computing devices to predict output data for a first type of task. The operations may also involve training the ANN with the first set of training data by adjusting values of only those weights associated with a first subset of neurons of the ANN, where the first subset of neurons is selected based on an identity of the first type of task. The operations may further involve receiving a second set of training data for training the ANN to predict output data for a second type of task, where the second type of task is different from the first type of task. Additionally, the operations may involve training the ANN with the second set of training data by adjusting values of only those weights associated with a second subset of neurons of the ANN, where the second subset of neurons is selected based on an identity of the second type of task. Further, during training of the ANN for any given type of task, adjusting of the value of any given weight associated with neurons of the ANN may involve: if the ANN has been previously trained for one or more task types different from the given type, computationally biasing adjustment of the value of the given weight according to a respective importance of the given weight to a predictive capability of the ANN for the one or more task types, and if the ANN has not been previously trained for any task types different from the given type, computationally adjusting the value of the given weight without bias.

In still another respect, example embodiments may involve an article of manufacture comprising non-transitory computer readable media having computer-readable instructions stored thereon that, when executed by one or more processors of a computing device, cause the computing device to carry out operations. The operations may involve receiving a first set of training data for training an artificial neural network (ANN) implemented on the one or more computing devices to predict output data for a first type of task. The operations may further involve training the ANN with the first set of training data by adjusting values of only those weights associated with a first subset of neurons of the ANN, where the first subset of neurons is selected based on an identity of the first type of task. The operations may also involve receiving a second set of training data for training the ANN to predict output data for a second type of task, where the second type of task is different from the first type of task. Additionally, the operations may involve training the ANN with the second set of training data by adjusting values of only those weights associated with a second subset of neurons of the ANN, where the second subset of neurons is selected based on an identity of the second type of task. Further, during training of the ANN for any given type of task, adjusting of the value of any given weight associated with neurons of the ANN may involve: if the ANN has been previously trained for one or more task types different from the given type, computationally biasing adjustment of the value of the given weight according to a respective importance of the given weight to a predictive capability of the ANN for the one or more task types, and if the ANN has not been previously trained for any task types different from the given type, computationally adjusting the value of the given weight without bias.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

FIG. 5C illustrates an example gating table for determining which neurons of an artificial neural network to gate during training and runtime, in accordance with example embodiments.

DETAILED DESCRIPTION

Figure 1:
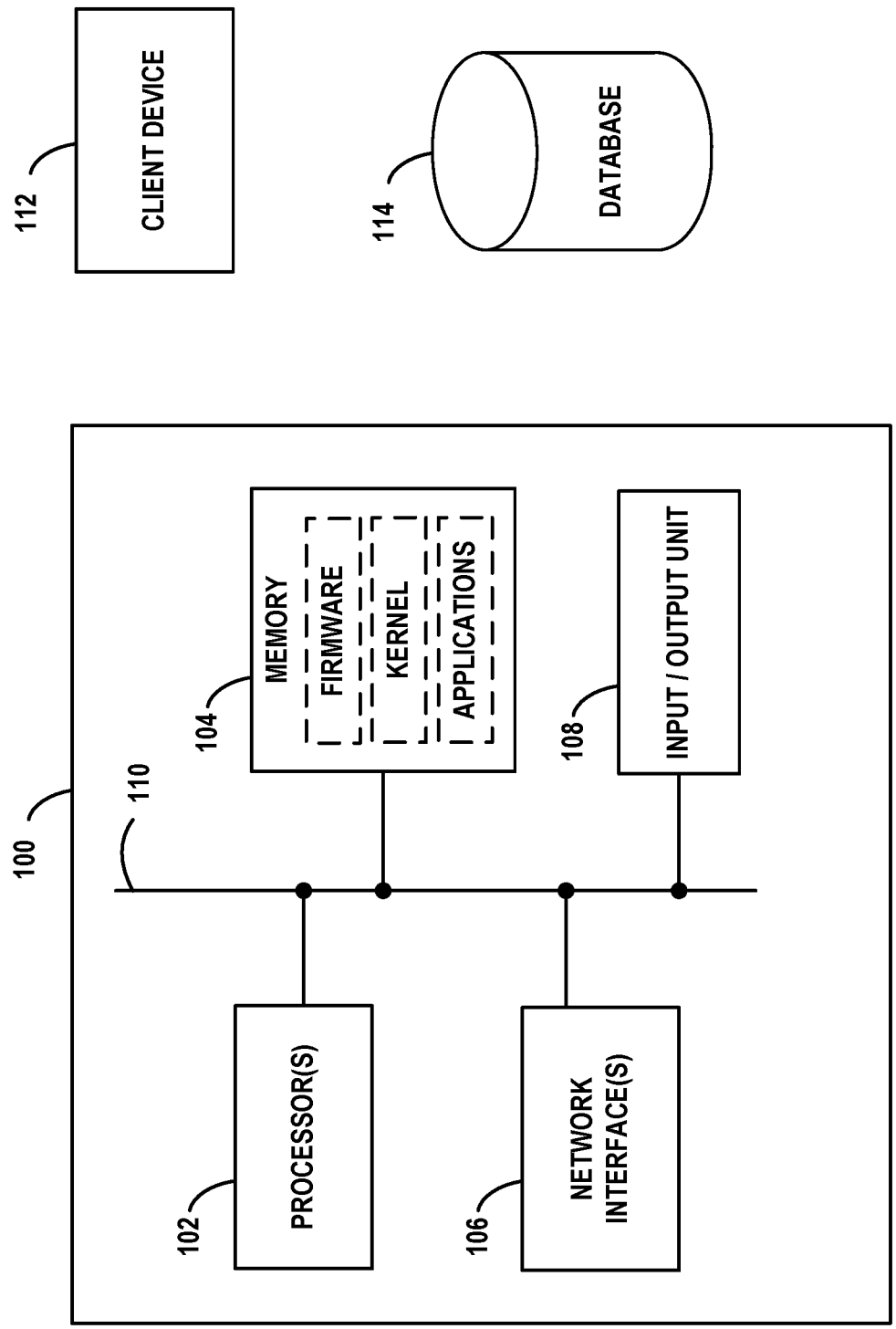
FIG. 1 depicts a simplified block diagram of an example computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

Humans and other advanced animals are capable of learning large numbers of tasks during their lifetime, without necessarily forgetting previously learned information. This ability to learn and not forget past knowledge, customarily referred to as continual learning, presents a significant challenge in the design of artificial neural networks (ANNs) that can build upon previous knowledge to solve new tasks. One reason is that when ANNs are trained on several tasks sequentially, using conventional techniques, they often suffer from "catastrophic forgetting," wherein learning new tasks degrades performance on previously learned tasks. This occurs because learning a new task can alter connection weights away from optimal solutions learned for previous tasks.

Among approaches tried for alleviating catastrophic forgetting in ANNs are stabilization techniques mentioned above. In some studies, applying these stabilization techniques has allowed ANNs to learn several (≤10) sequentially trained tasks with only a small loss in accuracy.

However, after large numbers (>>100) of different tasks, stabilization alone still suffers from forgetting. Consequently, the inventors have recognized the need to address whether utilizing multiple complementary algorithms can be more effective in supporting continual learning in ANNs than any one technique by itself.

In particular, the inventors have proposed a novel approach to alleviating catastrophic forgetting in ANNs based on a context dependence of learning observed in brain studies. Specifically, the inventors have undertaken to devise a mechanism in ANNs, referred to herein as "context-dependent gating" of neurons of an ANN. For demonstration purposes and by way of example, the inventors implemented and tested a simplified version of context-dependent gating involving sparse and mostly non-overlapping sets of units (neurons) that are active for any one task. Example embodiments employ an algorithm that includes an additional signal that is unique for each task, and that is projected onto all hidden neurons. In particular, this algorithm is simple to implement and requires little extra computational overhead compared with conventional techniques that do not address catastrophic forgetting, as well as stabilization techniques that attempt to.

Example embodiments herein are described in terms of a system and method for implementing feedforward networks trained on 100 sequential Modified National Institute of Standards and Technology (MNIST) permutations and on the ImageNet dataset split into 100 sequential tasks. The inventors established that both context-dependent gating and synaptic stabilization, when used alone, are each partially effective at alleviating forgetting across the 100 tasks. However, in an unexpected discovery, the inventors found that when context-dependent gating is utilized together with synaptic stabilization, their merged operation enables an ANN to successfully learn all 100 tasks with little forgetting. Furthermore, utilizing context-dependent gating jointly with stabilization allows recurrent neural networks (RNNs), trained by using either supervised or reinforcement learning, to sequentially learn 20 tasks commonly used in cognitive and systems neuroscience experiments with high accuracy. Thus, in accordance with example embodiments, context-dependent gating, when used in tandem with stabilization methods, may dramatically increase the ability of ANNs to learn large numbers of tasks without forgetting previous knowledge. The improvement in alleviating catastrophic forgetting is beyond what would otherwise have been expected from additive improvements of the individual techniques by themselves.

II. Example Computing Devices

FIG. 1 is a simplified block diagram of a computing device 100, in accordance with example embodiments. As shown, the computing device 100 may include processor(s) 102, memory 104, network interface(s) 106, and an input/output unit 108. By way of example, the components are communicatively connected by a bus 110. The bus could also provide power from a power supply (not shown). In particular, computing device 100 may be configured to perform at least one function of and/or related to components of artificial neural network 200, gating table 500 and/or 502, machine learning system 700, and/or method 800, all of which are described below.

Memory 104 may include firmware, a kernel, and applications, among other forms and functions of memory. As described, the memory 104 may store machine-language instructions, such as programming code or non-transitory computer-readable storage media, that may be executed by the processor 102 in order to carry out operations that implement the methods, scenarios, and techniques as described herein and in accompanying documents and/or at least part of the functionality of the example devices, networks, and systems described herein. In some examples, memory 104 may be implemented using a single physical device (e.g., one magnetic or disc storage unit), while in other examples, memory 104 may be implemented using two or more physical devices. In some examples, memory 104 may include storage for one or more machine learning systems and/or one or more machine learning models as described herein.

Processors 102 may include one or more general purpose processors and/or one or more special purpose processors (e.g., digital signal processors (DSPs) or graphics processing units (GPUs). Processors 102 may be configured to execute computer-readable instructions that are contained in memory 104 and/or other instructions as described herein.

Network interface(s) 106 may provide network connectivity to the computing system 100, such as to the internet or other public and/or private networks. Networks may be used to connect the computing system 100 with one or more other computing devices, such as servers or other computing systems. In an example embodiment, multiple computing systems could be communicatively connected, and example methods could be implemented in a distributed fashion.

Client device 112 may be a user client or terminal that includes an interactive display, such as a GUI. Client device 112 may be used for user access to programs, applications, and data of the computing device 100. For example, a GUI could be used for graphical interaction with programs and applications described herein. In some configurations, the client device 112 may itself be a computing device; in other configurations, the computing device 100 may incorporate, or be configured to operate as, a client device.

Database 114 may include input data, such as images, text, etc., that could be acquired for processing and/or recognition by a neural network, including artificial neural network 200 and context-dependent gating network 704. The data could additionally or alternatively be training data, which may be input to a neural network, including artificial neural network 200 and context-dependent gating network 704, for training, such as determination of weighting factors applied at various layers of the neural network. Database 114 could be used for other purposes as well.

III. Example Artificial Neural Networks

Artificial neural networks (ANNs) are computational models in which a number of relatively simple functional units, customarily referred to as neurons, are combined to solve complex problems. ANNs may be represented graphically as a number of connected nodes, where each node is a neuron, and the neurons are arranged in layers, with connections between the nodes (neurons) of adjacent layers. While ANNs may have a fixed structure and may be trained to solve one task at a time, example embodiments herein relate to training ANNs with dynamic structures that solve a plurality of tasks without forgetting previously trained tasks. In example embodiments, ANNs may be implemented as machine language instructions executable on a computing device, such as computing device 100.

Figure 2:
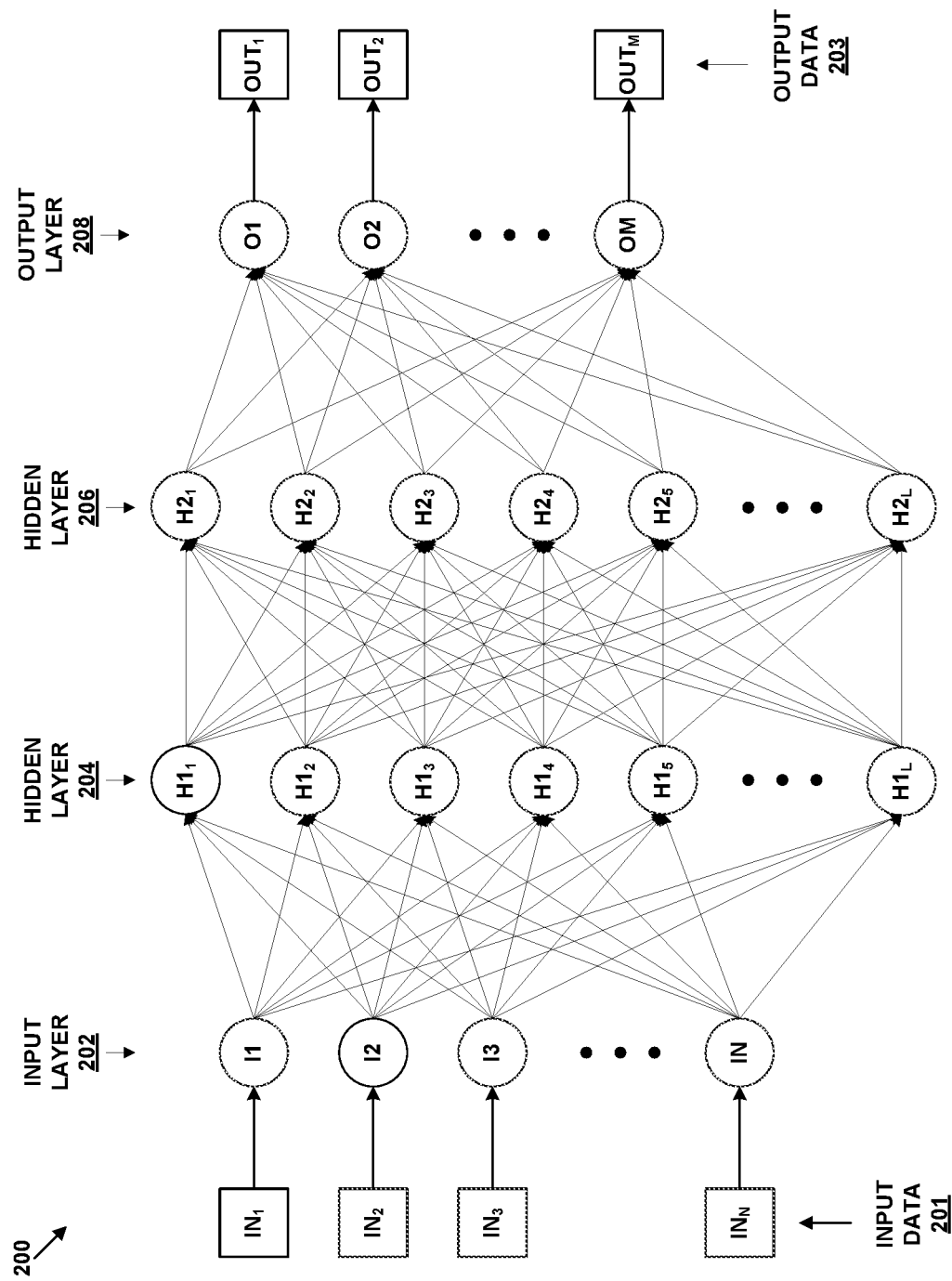
FIG. 2 is a conceptual illustration of an artificial neural network, in accordance with example embodiments.

FIG. 2 is a simplified architectural representation illustrating an artificial neural network (ANN) 200, in accordance with example embodiments. By way of example, the neurons of ANN 200 are arranged in four layers: input layer 202 made up of N neurons I1, I2, I3, . . . , IN; hidden layer 204 made up of L neurons $H1_1$, $H1_2$, $H1_3$, $H1_4$, $H1_5$, . . . , $H1_L$; hidden layer 206 made up of L neurons $H2_1$, $H2_2$, $H2_3$, $H2_4$, $H2_5$, . . . , $H2_L$; and output layer 208 made up of M neurons O1, O2, . . . , IN. For this example, the two hidden layers have the same number of neurons (L), while the input and output layer have N and M neurons respectively, where N and M signify two numbers that need not be the same (although they could be, and either or both could be equal to L).

In operation, each neuron of the input layer may receive the input data 201 for a task, and data may then flow from one layer to the next. This is represented in FIG. 2 by directed arrows connecting neuron outputs in one layer to neuron inputs in the next layer. By way of example, ANN 200 is a fully-connected network, where the output of each neuron in one layer is connected to the input of each neuron in the next layer, except for output layer 208, in which the neuron outputs represent the output data 203 of the ANN for the task.

As described above, each neuron computes an activation function of its inputs and outputs the result to each neuron in the next layer to which it is connected. Non-limiting examples of activation function include tanh, ReLu, and sigmoid; other suitable functions may be used as well. Each connection may be associated with a respective weight that may be applied (e.g. as a multiplier or scale factor) to the output value of a neuron. When making a prediction for a task, each neuron performs an operation on its input values prior to applying the activation function. This operation may involve a dot-product (or inner product) sum of the input values with their associated weights applied and a bias term, b, added. The activation function may then be applied to the dot-product sum to produce the final output value of a neuron.

Training ANN 200 on a task may involve inputting "training data" to the ANN 200 during training in order to learn values of weights, such that the ANN 200 may subsequently accurately predict output values when later given "runtime data" input values for the task. Learning weights may be accomplished using a loss function to compute an error between the produced output values and ground truth output values (e.g., known, correct values) for a single training example associated with the training data for a task. Non-limiting examples of loss functions may include hinge loss, square loss, 0/1 loss, cross-entropy, or some other metric. A cost function could then be used to average the loss functions over all training examples associated with the training data for a task while adding model complexity penalties. Once the output of the cost function is determined, weights of the connections may be updated by propagating the error one layer at a time through ANN 200 in an attempt to reduce the error. This form of updating is customarily referred as backpropagation, and may be based on the derivative of the activation function.

The training process for a task on ANN 200 may continue until the training values of weights converge. For example, convergence may occur when the error determined by the cost function is less than a predetermined threshold value, the change in the error determined by the cost function is sufficiently small between consecutive iterations of training, or a predetermined maximum number of iterations has been reached. At this point, ANN 200 may be considered "trained" on a particular task, and may be applied at runtime to new inputs for runtime data associated with the particular task in order to predict runtime values.

In the current disclosure, ANN 200 may be used to illustrate the techniques and concepts as described herein. That is, each scenario as described herein may utilize a new, untrained instance of ANN 200 to exemplify one or more techniques. Moreover, while ANN 200 may be represented as a feed-forward multilayer neural network, the structures and principles herein may be used with convolutional neural networks (CNNs), recurrent neural networks (RNNs), and other ANN architectures. Additionally, while ANN 200 is shown as a fully-connected network, non-fully connected networks may be possible within the context of the current disclosure.

Figure 3A:
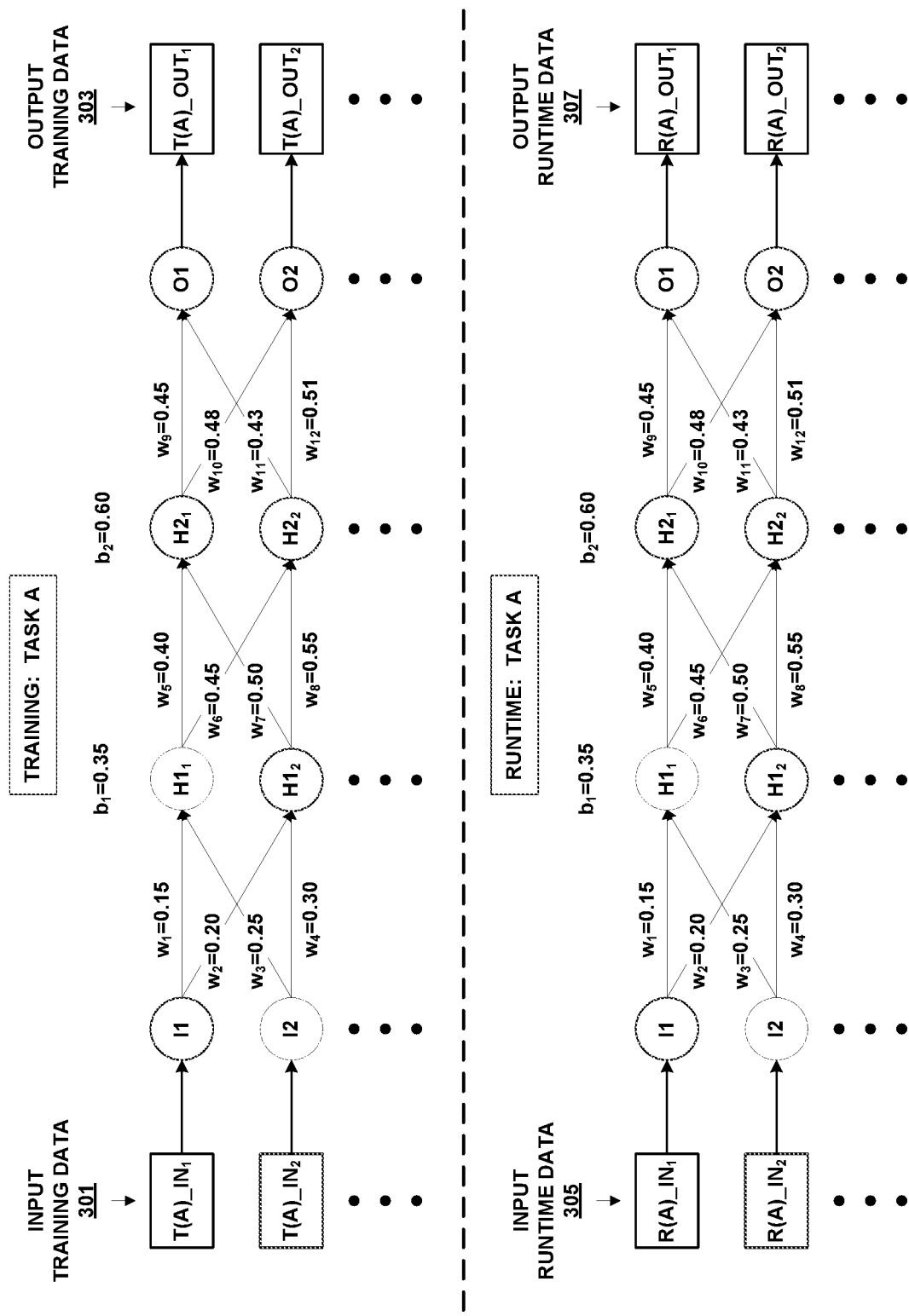
FIG. 3A illustrates an example of training an artificial neural network on an example task A, then using the trained artificial neural network to perform task A at runtime, in accordance with example embodiments.
Figure 3B:
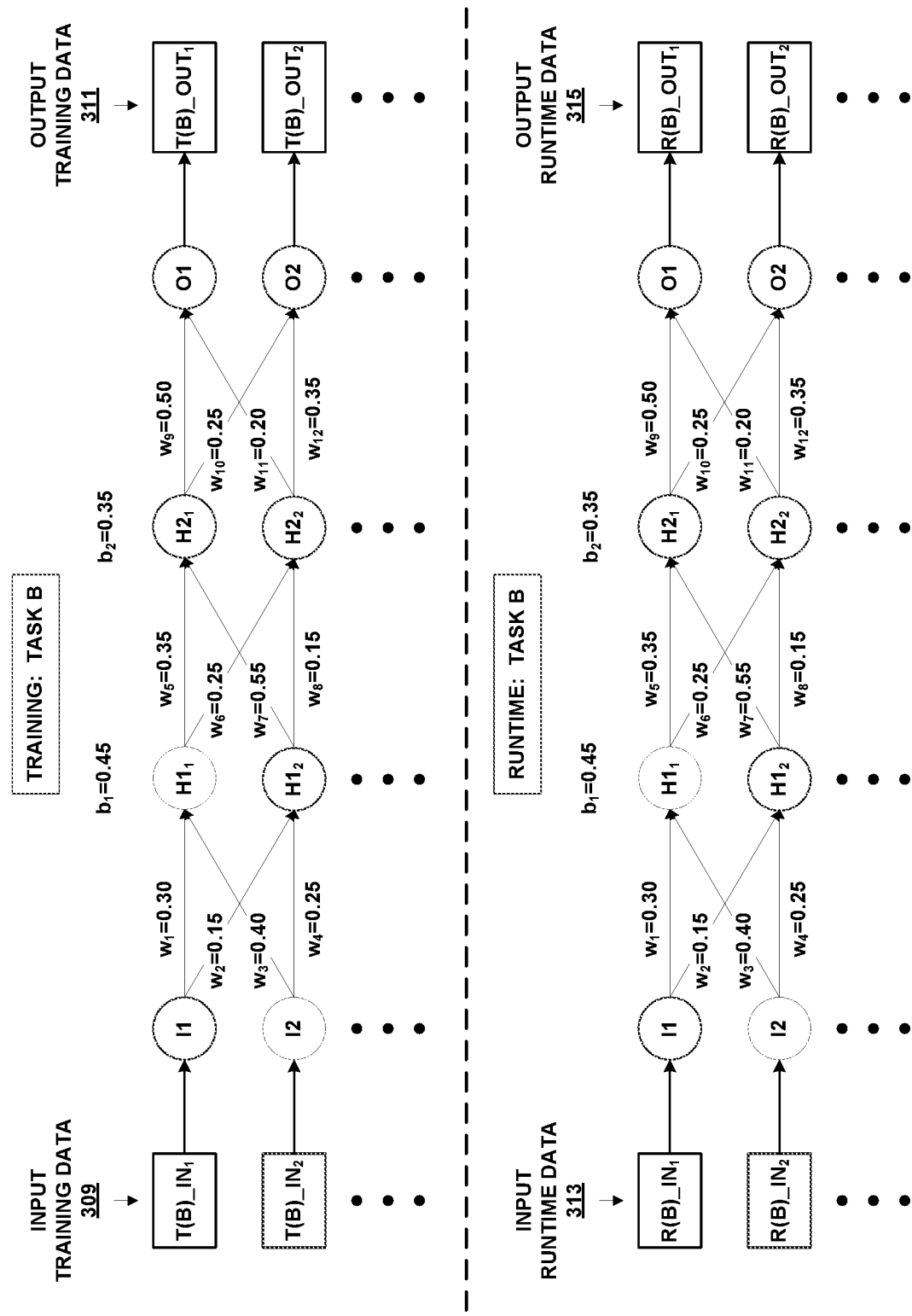
FIG. 3B illustrates an example of training an artificial neural network on an example task B after training on example task A, then using the trained artificial neural network to perform task B at runtime, in accordance with example embodiments.

FIGS. 3A and 3B illustrate example scenarios for training ANN 200 with a first task and then training ANN 200 with a second task. For purposes of discussion herein, the two tasks are referred to as "task A" and "task B." Task A may represent any supervised learning or reinforcement learning task, for example. Task B may represent any supervised learning or reinforcement learning task that is different from the task A. Non-limiting examples of tasks may include identifying a motorcycle given an image, identifying a country given a set of general population statistics, and/or other similar learning tasks In both FIGS. 3A and 3B, only a portion of ANN 200 is depicted; specifically, only the first two neurons in each layer. Namely, I1 and I2 in input layer 202; $H1_1$, $H1_2$ in hidden layer 204; $H2_1$, $H2_2$ in hidden layer 206; and O1 and O2 in output layer 208. Vertical ellipses in each figure represent the continuation of neurons in each layer. The top panel in each figure (above the horizontal dotted line) represents training of ANN 200 for a given task, and the bottom panel in each figure (below the horizontal dotted line) represents runtime operation of ANN 200 for a given task. For the depicted portions of ANN 200 in each panel of FIGS. 3A and 3B, each of the connections between the neurons is displayed with an associated weight. As shown, the weights are labeled $W_1$, $W_2$, $W_3$, . . . , $W_{12}$. In addition, bias values are displayed for each hidden layer of the depicted portion of ANN 200. As shown, the biases are labeled $b_1$ and $b_2$. The values of the weights and biases in each depicted portion of ANN 200 may be considered arbitrary numbers that serve as examples of the present discussion.

The top panel of FIG. 3A illustrates training of ANN 200 for task A. During training, input training data 301 are input to the input layer of ANN 200. As shown, input training data value T(A)_IN$_1$ is input at (or received by) I1 of the input layer, and input training data value T(A)_IN$_2$ is input at (or received by) I2 of the input layer. During training, ANN output training data 303 are output by the output layer of ANN 200. As shown, output training data value T(A)_OUT$_1$ is output by O1 of the output layer, and output training data value T(A)_OUT$_2$ is output at O2 of the output layer. Through backpropagation (or some other tuning/adjustment procedure), the weights $W_1$, $W_2$, $W_3$, ..., $W_{12}$ and biases $b_1$ and $b_2$ are adjusted until ANN 200 is determined by some predefined criteria to be trained. The values of the weights and biases in the top panel of FIG. 3A may be considered the final, trained values for task A.

The bottom panel of FIG. 3A illustrates runtime operation of ANN 200 for task A after training has been accomplished. More particularly, input runtime data 305 are input to the input layer of ANN 200. As shown, input runtime data value R(A)_IN$_1$ is input at (or received by) I1 of the input layer, and input runtime data value R(A)_IN$_2$ is input at (or received by) I2 of the input layer. During runtime, output runtime data 307 are output by the output layer of ANN 200. As shown, output runtime data value R(A)_OUT$_1$ is output by O1 of the output layer, and output runtime data value R(A)_OUT$_2$ is output at O2 of the output layer. The values of the weights and biases during runtime are the same as those determined by training for task A, as may be seen by inspection of the top and bottom panels of FIG. 3A. For runtime operation, the runtime outputs represent predicted values for task A. The accuracy of those predicted values is therefore associated with the trained weights for task A.

The two panels of FIG. 3B show corresponding training and runtime operation of ANN 200 for task B. During training, input training data 309 are input to the input layer of ANN 200, and output training data 311 are output by the output layer of ANN 200. The input training values are labeled T(B)_IN$_1$ and T(B) IN$_2$, corresponding to task B training data. Similarly, output training values are labeled T(B)_OUT$_1$ and T(B)_OUT$_2$, corresponding to training predictions for task B. Backpropagation (or some other tuning/adjustment procedure) may again be used to determine the weights $W_1$, $W_2$, $W_3$, ..., $W_{12}$ and biases $b_1$ and $b_2$, but this time for task B. The values of the weights and biases in the top panel of FIG. 3B may be considered the final, trained values for task B.

The bottom panel of FIG. 3B illustrates runtime operation of ANN 200 for task B after training has been accomplished. During runtime, input runtime data 313 are input to the input layer of ANN 200, and output runtime data 315 are output by the output layer of ANN 200. The input runtime values are labeled R(B)_IN$_1$ and R(B)_IN$_2$, corresponding to task B runtime data. Similarly, output runtime values are labeled R(B)_OUT$_1$ and R(B)_OUT$_2$, and these correspond to runtime predictions for task B. The values of the weights and biases during runtime are the same as those determined by training for task B, as may be seen by inspection of the top and bottom panels of FIG. 3B. For runtime operation, the runtime outputs represent predicted values for task B. The accuracy of those predicted values is therefore associated with the trained weights for task B.

As may be seen by comparing FIGS. 3A and 3B, the values of the weights and biases of ANN 200 after training for task B have changed from those after training for task A. (Again, the actual values shown for both tasks are arbitrary and illustrative only.) The differences between the respective values for the two tasks are meant to demonstrate how ANN 200 may be subject to catastrophic forgetting of its task A training after it has been trained for task B. Thus, as a result of the changes in the weights and biases after training for task B, the accuracy of predicted runtime values for task A runtime input data may be diminished, and performance of ANN 200 when applied to task A runtime data subsequent to training for task B may be degraded. Catastrophic forgetting for task A may become more severe after training ANN 200 for additional tasks, such as task C, task D, and so on. Similarly, the predictive accuracy of ANN 200 for task B may degrade as ANN 200 is trained for additional tasks. In general, it may be expected that the earlier in a sequence of task trainings the training for a given task is carried out, the more severe the degradation of predictive capability of ANN 200 for the given task, though this may not necessarily be the case.

The weights and biases determined from training an ANN, such as ANN 200, may not necessarily represent the only configuration of weight values that yield acceptable predictive performance of the ANN for a given task. In practice, there may be a plurality of configurations of task A weights and task B weights that may yield high accuracies for task A and task B, respectively. In analytical terms, task A may contain an optimal region of parameter space for ANN 200, where all sets of weight values in the optimal region yield at least a threshold accuracy score when applying ANN 200 on task A input values. Similarly, task B may also contain an optimal region of parameter space for ANN 200, where all sets of weight values in the optimal region yield at least a threshold accuracy score when applying ANN 200 on task B input values. In some cases, the optimal regions of task A and task B may overlap and may contain one or more sets of weight values that achieve at least a threshold accuracy score when applying ANN 200 on both task A and task B input values. In accordance with example embodiments, high accuracy, overlapping regions of ANN 200 may be identified so as to achieve high accuracies when ANN 200 is applied to both task A and task B input values.

In further accordance with example embodiments, high accuracies for sequential tasks A and B, as well as possibly for additional sequential task trainings, may be achieved using techniques for constraining adjustment of selected weight values of an ANN, such as ANN 200, during sequential trainings of multiple tasks, such as task A and task B. In particular, by judicious application of constrained adjustment during training, it may be possible to identify high accuracy, overlapping regions that give low error predictions for one task, such as task B, without incurring a significant loss in accuracy for another earlier-trained task, such as task A.

IV. Context-Dependent Gating and Weight Stabilization

One approach to alleviating or mitigating catastrophic forgetting in ANNs is to determine an "importance" of each weight to the predictive capability of the ANN for a given task, and bias adjustment of each weight during subsequent task trainings in proportion to, or as a function of, the determined importance. The adjustment bias for a given weight thus acts to computationally inhibit adjustment of the given weight based, at least in part, on the importance of the weight to one or more other tasks for which the ANN has previously been trained. Note that in this context, the bias applied to adjusting weights during training should not be confused with the bias parameters of the ANN. In view of the resistance to adjustment of weights with high importance to previously-trained tasks, this approach is referred herein as "weight stabilization," and may be considered a more general example of "synaptic stabilization" as mentioned above.

The importance of a given weight to the predictive capability of the ANN for a given task may be signified by an "importance score" that measures the effect that changing the given weight from its optimal (trained) value has on the predictive capability of the ANN for the given task. In example embodiments, the larger the importance score, the more deleterious the effect of changing the given weight from its optimal value. A high importance score may be indicative of how quickly the predictive capability of the ANN deteriorates with a change of the given parameter, and/or how much the ANN deteriorates with a given amount change of the given parameter. In practice, an importance score may be assigned to all or a subset of weights of an ANN, and the effect of changes to the weights may be determined in aggregate. Importance scores for a given task may be applied as scale factors, or some other function, in order to determine the overall effect on the predictive capability of the ANN of adjusting the ANN weights during training for other tasks.

By including importance scores as a scaling factors or some other function, it may be possible to determine how changes to weights between tasks affect the overall predictive capability for ANN 200 for previous tasks. For example, large or even moderate or small changes to weights with high importance scores for task A may cause runtime performance on task A to decrease drastically, whereas large changes to weights with low important scores for task A may cause only a small or nominal decrease to the runtime performance on task A. In accordance with example embodiments, important scores may be utilized by a loss function of ANN 200 to determine the weight changes for ANN 200 that minimize global error (e.g., error across the current task being trained on ANN 200 and previous tasks that have been trained on ANN 200). To accomplish this, the loss function may be constructed so as to place high penalties for large shifts to the weights identified as important for any previous tasks.

In accordance with example embodiments, importance scores may be applied to weight adjustment as a sort of penalty that computationally inhibits weight adjustment in dependence on the importance scores. The greater the importance score of a previously trained weight, the greater the penalty of adjusting that weight during a subsequent training, and the greater the computational inhibition of adjusting the weight during the subsequent training.

Figure 4A:
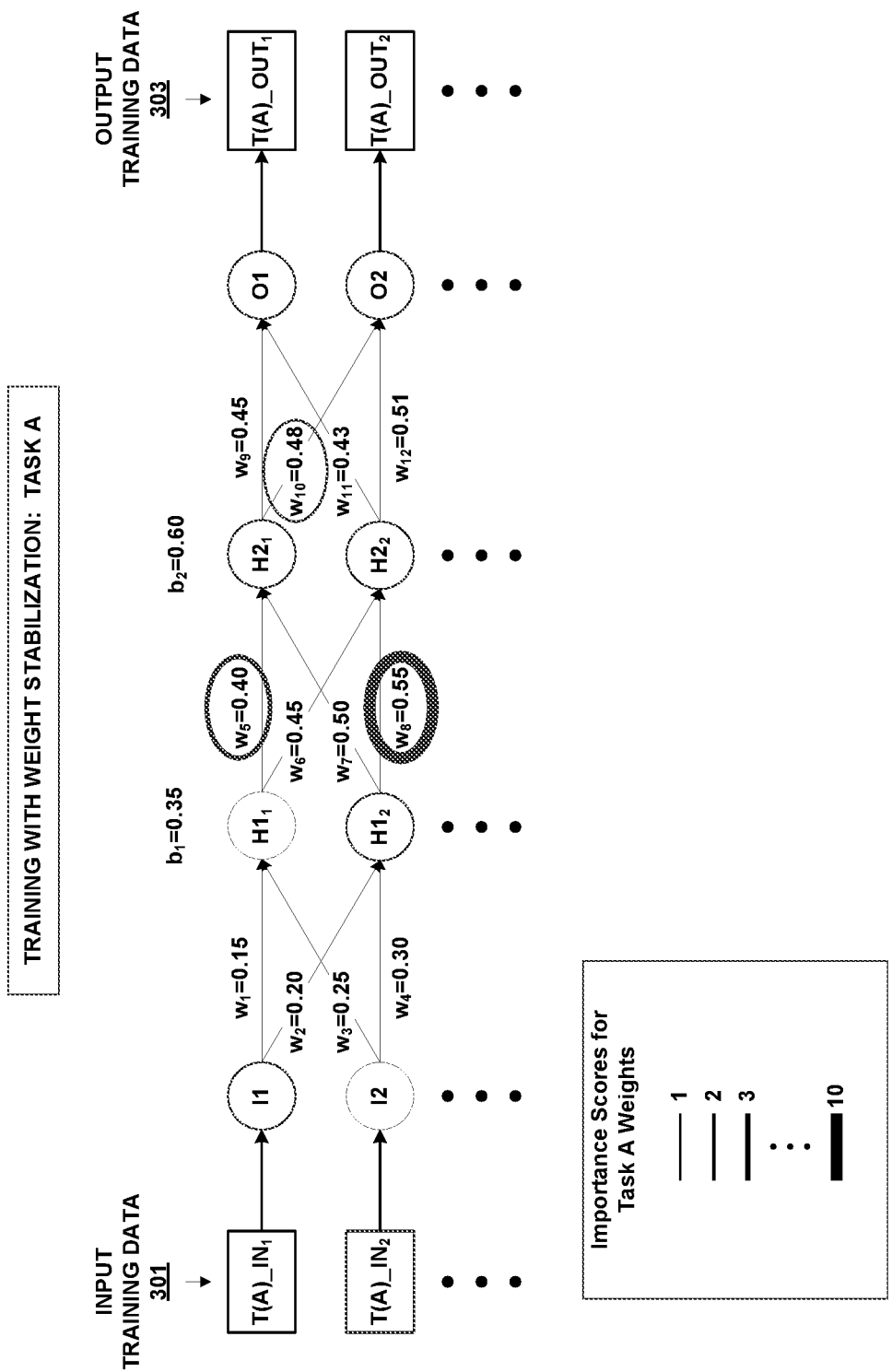
FIG. 4A illustrates an example of training an artificial neural network on an example task A using weight stabilization, in accordance with example embodiments.
Figure 4B:
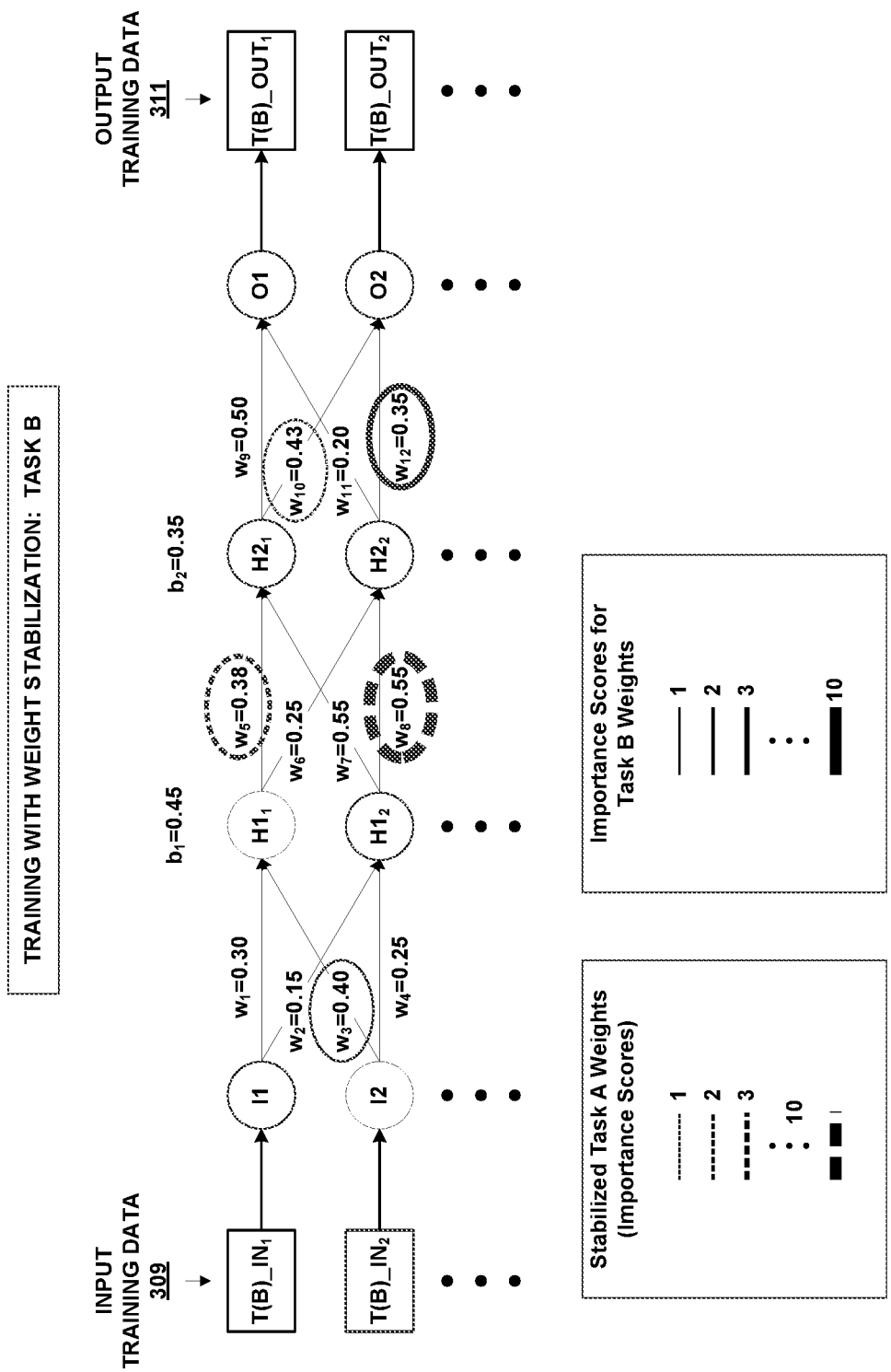
FIG. 4B illustrates an example of training an artificial neural network on an example task B using weight stabilization after training on example task A using weight stabilization, in accordance with example embodiments.

FIGS. 4A and 4B are conceptual illustrations of weight stabilization during sequential training of ANN 200 for tasks A and B. Each figure depicts the same portion of ANN 200 as FIGS. 3A and 3B, namely the first two neurons of each layer. The input training and output training data in FIGS. 4A and 4B are also the same as in FIGS. 3A and 3B, as are the input and output neurons.

FIG. 4A shows the depicted portion of ANN 200 after training for task A. The indicated weight values are the same as those in FIG. 3A. In addition, FIG. 4A indicates importance scores as ovals encircling labeled weights and values. The thickness of the line of each oval signifies the importance of the weight to the predictive capability of ANN 200 to task A. A legend in FIG. 4A shows example importance scores, 1, 2, 3, . . . , 10, associated with different line thicknesses. It will be appreciated that the legend is just a convenient conceptual representation of importance scores, and not intended to be limiting with respect to example embodiments or techniques described herein.

By way of example, only three weights in FIG. 4A are explicitly shown as having importance scores. Namely, $W_5$, with an importance score of 3; $W_8$, with an importance score of 10; and $W_{10}$, with an importance score of 1. Importance scores for the other weights are omitted for the sake of clarity in FIG. 4A. The importance scores determined for task A may then be used in weight stabilization when ANN 200 is trained for task B.

Training for task B is illustrated in FIG. 4B. The importance scores for weights determined for task A are now shown in FIG. 4B with dotted lines; a legend at the lower left of FIG. 4B indicates the importance scores of task A weights according to thickness of the dotted lines. As a conceptual illustration of weight stabilization, the task A weights have changed after training for task B in accordance with their respective task A importance. For this illustration, $W_5$, with a task A importance of 3, has changed from 0.40 to 0.38; $W_8$, with a task A importance of 10, has not changed at all; and $W_{10}$, with a task A importance of 1, has changed from 0.48 to 0.43. In addition, other weights trained for task B may also be assigned importance scores. This is indicated by way of example for weight $W_3$ and weight $W_{12}$.

As mentioned above and summarized below, weight stabilization, or synaptic stabilization, by itself provides only limited improvement in ANN performance after multiple sequential trainings for different tasks. To increase accuracy for large numbers of tasks, ANN 200 may be configured to retain a "pool" of low importance weights that may be adjusted by sufficient amounts to learn new tasks. This pool of weights may be obtained, for example, by restricting the training of ANN 200 for each task to respective predetermined subsets of units, thus allowing ANN 200 to retain weights that have not been previously used or have been used sparingly during the training of previous tasks. This restriction, referred to herein as "gating," may allow ANN 200 to maintain low importance weights that may be adjusted by large amounts when training for new tasks, without disrupting performance on previous tasks.

In accordance with example embodiments, subsets of neurons may be gated (or not gated) during training based on identification of the task for which the ANN is being trained. Association of neuron subsets for gating with respective tasks is referred to herein as "context dependent gating." It will be appreciated that subsets of neurons of an ANN may be defined either by whether they are gated or not gated. Thus, if the subset specifies gated neurons, then neurons of the subset will remain inactive during training, while those not in the subset will remain active during training. Alternatively, if the subset specifies ungated neurons, then neurons of the subset will remain active during training, while those not in the subset will remain inactive (gated) during training. For either definition, the total number of neurons under consideration will be the number in the subset and those not in the subset.

Figure 5A:
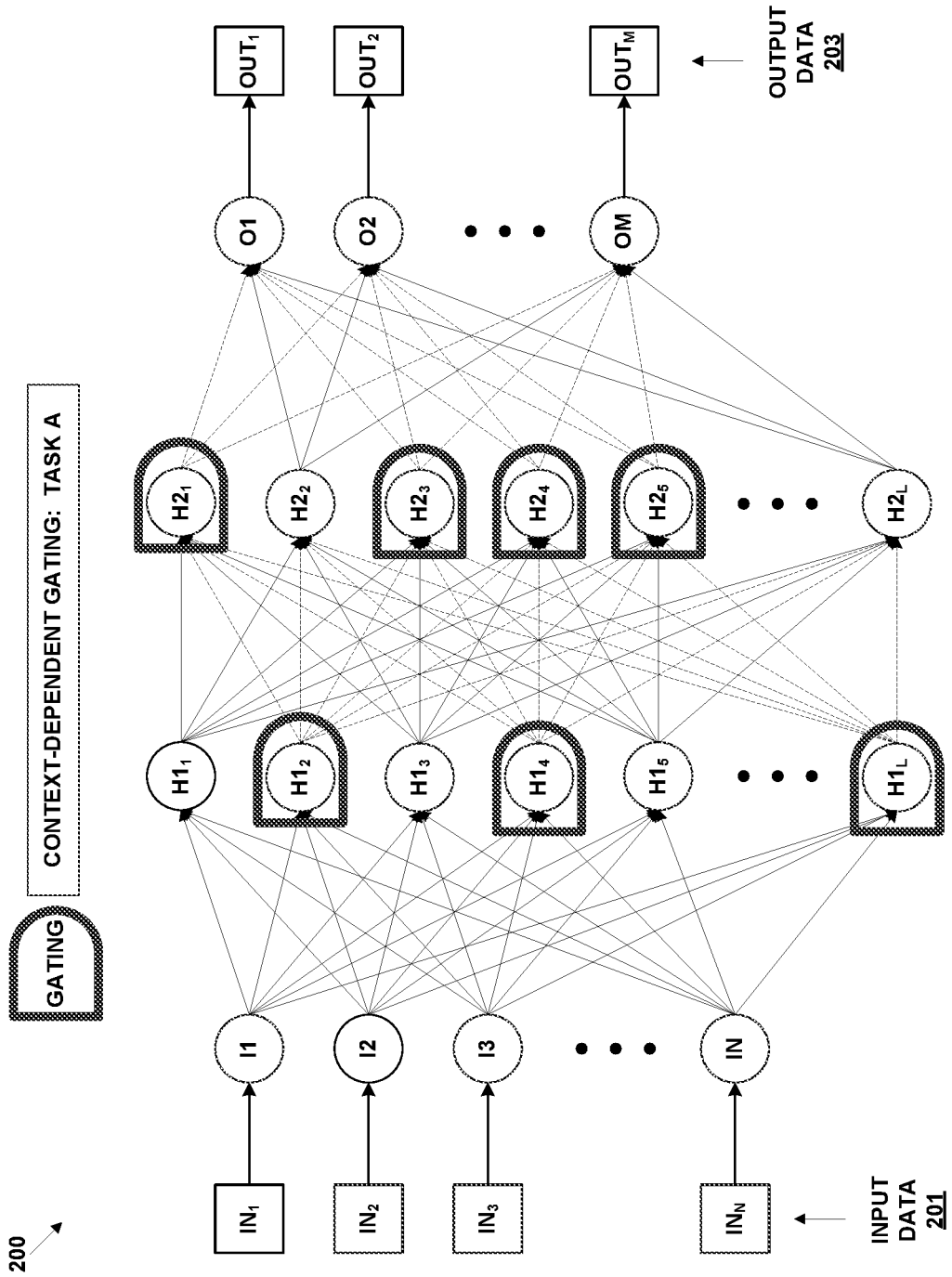
FIG. 5A illustrates an example of training an artificial neural network on an example task A using context-dependent gating, in accordance with example embodiments.
Figure 5B:
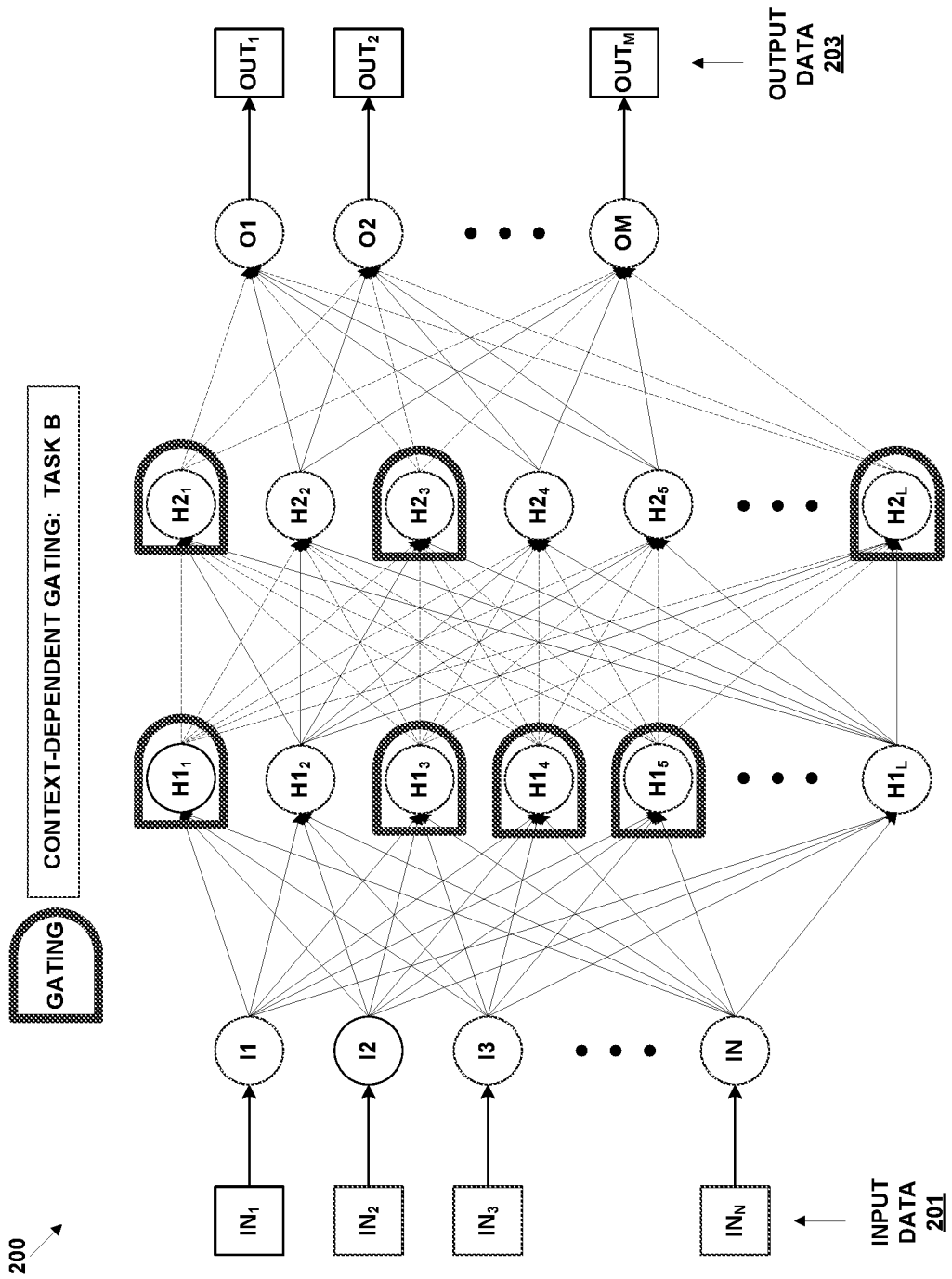
FIG. 5B illustrates an example of training an artificial neural network on an example task B using context-dependent gating after training on example task A using context-dependent gating, in accordance with example embodiments.

FIGS. 5A and 5B are conceptual illustrations of context-dependent gating during sequential training of ANN 200 for tasks A and B. In these figures, the entire ANN 200 as depicted in FIG. 2 is shown in order to better illustrate the distribution of gated and ungated neurons during training. In accordance with example embodiments, context-dependent gating may be applied only to neurons in the hidden layers. However, this is not necessarily a requirement for all embodiments.

In both FIGS. 5A and 5B a digital electronics gating symbol is used to signify which neurons are gated. For example in FIG. 5A, neurons $H1_2$, $H1_4$, $H1_L$, $H2_1$, $H2_3$, $H2_4$, and $H2_5$ of the hidden layers are gated during training for task A. The remaining neurons of the hidden layer are ungated. Thus, during training for task A—i.e., the context for gating—only the ungated neurons will be active, so that only the weights of the ungated neurons will be subject to adjustment during training for task A. By way of example, the gating is accomplished by gating the outputs of each gated neuron. This is represented by depicting the outputs of the gated neurons as dashed lines, while the outputs of the ungated neurons are depicted as solid lines. In practice, output gating can be implemented by multiplying the output activations of the gated neurons by zero. Gating can also be implemented by zeroing the inputs to gated neurons (input gating), or by zeroing both inputs and outputs of gated neurons (input/output gating). As a result of the gating shown in FIG. 5A, the weights of gated neurons will be unchanged by training.

In FIG. 5B, neurons $H1_1$, $H1_3$, $H1_4$, $H1_5$, $H2_1$, $H2_3$, and $H2_L$ of the hidden layers are gated during training for task B. The remaining neurons of the hidden layer are ungated. Thus, during training of task B—i.e., the context for gating—only the ungated neurons will be active, so that only the weights of the ungated neurons will be subject to adjustment during training for task B. In particular, the task B weights of the output connections of the gated neurons will not be changed during training for task B. Again, gating is represented by depicting the outputs of the gated neurons as dashed lines, while the outputs of the ungated neurons are depicted as solid lines.

In accordance with example embodiments, neurons identified for gating (or not gating) for each task may be selected at random from among the hidden layers. Further, the number of gated neurons may be determined as a fraction or percentage of the total number of neurons under consideration for gating (e.g., those of the hidden layers). For example, if the fraction of gated neurons is given by x, where x<1, the fraction of ungated neurons will be given by 1−x; in percentage terms, X=100x % will be gated and (100−X) % will be ungated. For each of multiple tasks, X (or x) may be the same, while the actual neurons gated may be selected at random for each task. In testing and demonstrations, X in an approximate range of 80-90% was used. However, different values may be used, and optimal values may be determined through testing, for example.

Also in accordance with example embodiments, the selected subsets of ungated neurons for each task may be recorded and stored in one or another form of memory, so that the subset associated with each given task may be quickly and reliably identified for training and/or runtime operation for each task. In one example, the subsets may be recorded in the form of a gating table having one row for each task and one column for each hidden-layer neuron. Each entry of gating table may then be a 1 or 0 depending on whether the neuron of the associated column is ungated or gated for the task of the associated row.

FIG. 5C illustrates an example such a gating table 500. As shown, the rows are labeled as (example) tasks A, B, C, . . . , Q, and the columns are labeled as neurons $H1_1$, $H1_2$, $H1_3$, $H1_4$, $H1_5$, . . . , $H1_L$; $H2_1$, $H2_2$, $H2_3$, $H2_4$, $H2_5$, . . . , $H2_L$. The entries in the rows for tasks A and B correspond to the gated neurons (0) and ungated neurons (1) shown in FIGS. 5A and 5B. The entries shown for tasks C, . . . , Q specify what the gating arrangement would be for these tasks.

Figure 5D:
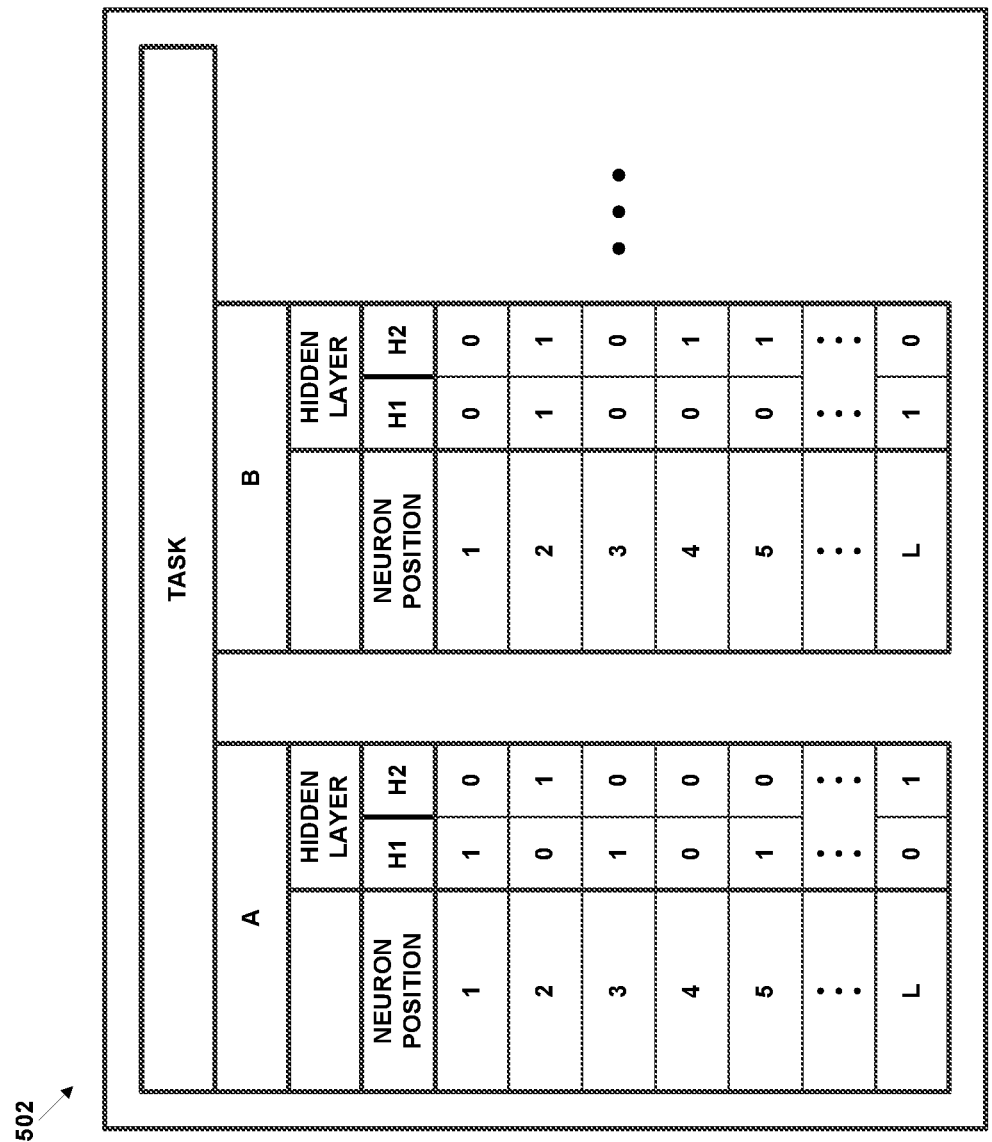
FIG. 5D illustrates an alternative example gating table for determining which neurons of an artificial neural network to gate during training and runtime, in accordance with example embodiments.

In another example embodiment, the gating table can take the form of a three-dimensional table in which one dimension corresponds to the multiple tasks, and the other two dimensions are columns that correspond to hidden layer position in the ANN, and rows that correspond to neuron position in the hidden layer. An example of this form of gating table is illustrated in FIG. 5D as gating table 502. Each entry of gating table 502 may then be a 1 or 0 depending on whether the neuron at the associated position (row) and associated hidden layer (column) is ungated (1) or gated (0). For each task shown (A and B in the example), the gating table for the task can act as a sort of mask on the neuron configuration of the hidden layers, picking out gating or not gating according to the entry value.

As also mentioned above and summarized below, context-dependent gating by itself may provide limited improvement in ANN performance after multiple sequential trainings for different tasks. However, the inventors discovered that using both context-dependent gating and weight stabilization during training not only improved overall predictive accuracy of an ANN trained for multiple tasks, but significantly reduced the degradation of performance after 100s of sequential trainings for multiple tasks. In addition, the degradation that was observed in experiments appeared to level off rather than continue to drop.

Figure 6A:
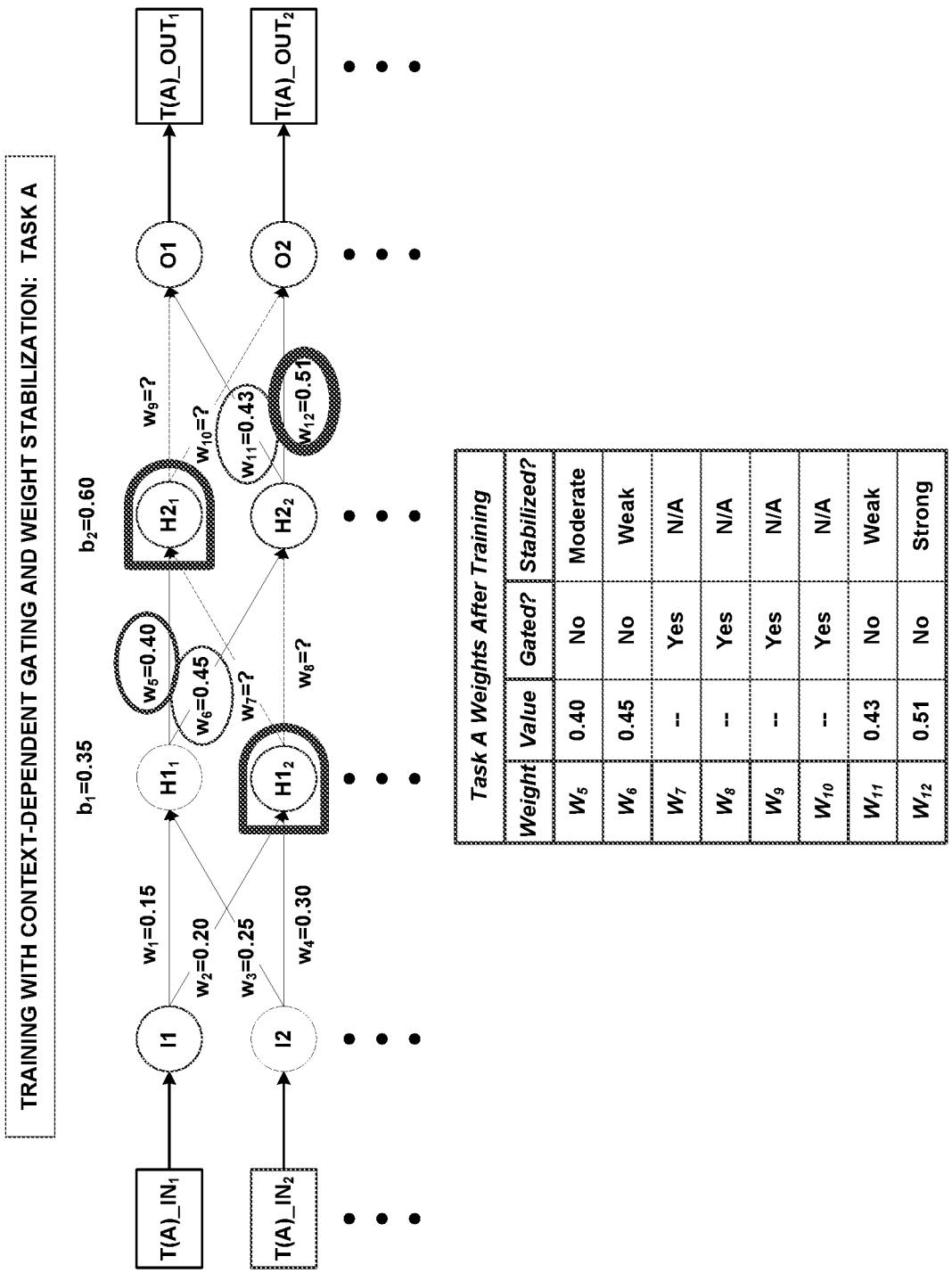
FIG. 6A illustrates an example of training an artificial neural network on an example task A using context-dependent gating and weight stabilization, in accordance with example embodiments.
Figure 6B:
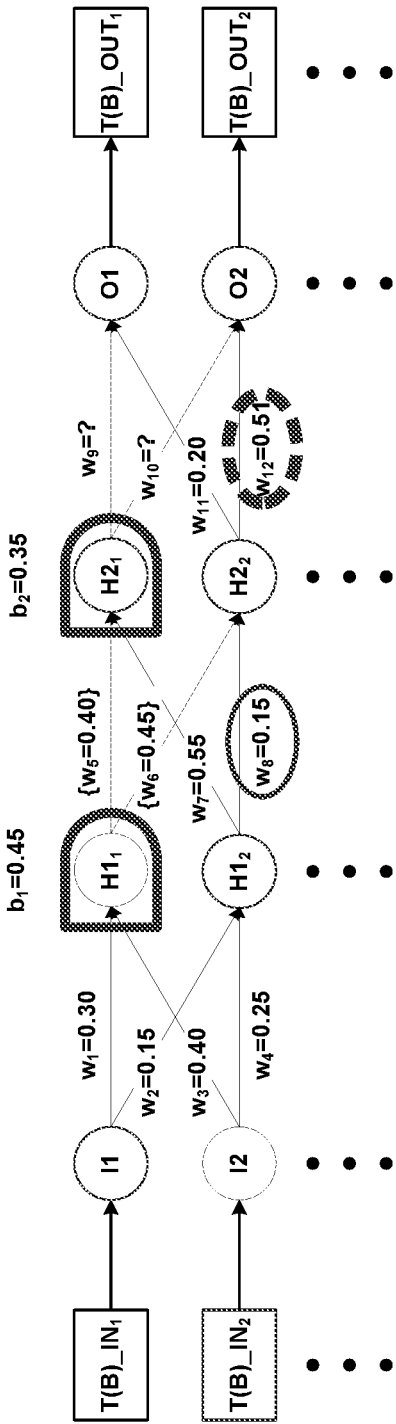
FIG. 6B illustrates an example of training an artificial neural network on an example task B using context-dependent gating and weight stabilization after training on example task A using context-dependent gating and weight stabilization, in accordance with example embodiments.

FIGS. 6A and 6B are conceptual illustrations of jointly using both context-dependent gating and weight stabilization during training of ANN 200 for tasks A and B. As in some previous figures, only the portion of ANN 200 with the first two neurons of each layer is depicted in FIGS. 6A and 6B. Training for task A is shown in FIG. 6A. By way of example, neurons $H1_2$ and $H2_1$ are shown to be gated, and weights $W_5$, $W_6$, $W_{11}$, and $W_{12}$ are shown to have importance scores of 3, 1, 1, and 10, respectively, after training. Note that the values of weights $W_7$, $W_8$, $W_9$, and $W_{10}$ are shown as question marks ("?") to signify that they are not adjusted during training because they are outputs of gated neurons. A legend in FIG. 6A indicates for each of weights $W_5$, $W_6$, $W_7$, $W_8$, $W_9$, $W_{10}$, $W_{11}$, and $W_{12}$ the trained value, whether or not its activation neuron is gated, and whether and how much it is stabilized against adjustment in subsequent trainings.

For example, $W_5$ has a trained value of 0.40, is the output of an ungated neuron, and has "moderate" stabilization (importance score of 3). Similarly, $W_{12}$ has a trained value of 0.51, is the output of an ungated neuron, and has "strong" stabilization (importance score of 10). Note that weights $W_7$, $W_8$, $W_9$, and $W_{10}$ have no trained values because they are the outputs of gated neurons. For the same reason, they have no importance scores ("N/A") in the legend. The importance scores of $W_5$, $W_6$, $W_{11}$, and $W_{12}$ may be used when training for task B, as described next.

Training for task B is shown in FIG. 6B. By way of example, neurons $H1_1$ and $H2_1$ are shown to be gated, and weight $W_8$ is shown to have an importance score of 3 after training. The values of weights $W_5$ and $W_6$ are shown to be unchanged from their task A trained values. This is because these weights are outputs of a gated neuron ($H1_1$) during task B training. Weights $W_9$, and $W_{10}$ are shown as question marks ("?") to signify that they are not adjusted during training because they are outputs of gated neurons and had no initial values prior to training. And weight $W_{12}$ is also unchanged during task B training. But this is because weight $W_{12}$ has an importance score of 10 from its task A training, and was thus strongly stabilized against adjustment. This illustrates how both context-dependent gating and weight stabilization are operational during task B training.

A legend in FIG. 6B indicates for each of weights $W_5$, $W_6$, $W_7$, $W_8$, $W_9$, $W_{10}$, $W_{11}$, and $W_{12}$ the trained value, whether or not its activation neuron is gated, whether or not a previously trained value was changed and for what reason, and whether and how much it is stabilized from training on task B. Weight values shown in curly brackets ("{ }") indicate weight values unchanged from values determined from a previous training.

The conceptual illustrations of FIGS. 6A and 6B are not intended to be complete. Rather they show how both context-dependent gating and weight stabilization may be operational during training an ANN for multiple tasks in multiple, sequential trainings. The significant degree of improvement over applying either one of these techniques by themselves observed during tests and experimental trials was unexpected. Accordingly, the inventors' discovery of the advantages of using both techniques together represents a significant and unanticipated advancement in efforts to alleviate catastrophic forgetting in ANNs trained for multiple tasks.

V. Example Architecture

Figure 7:
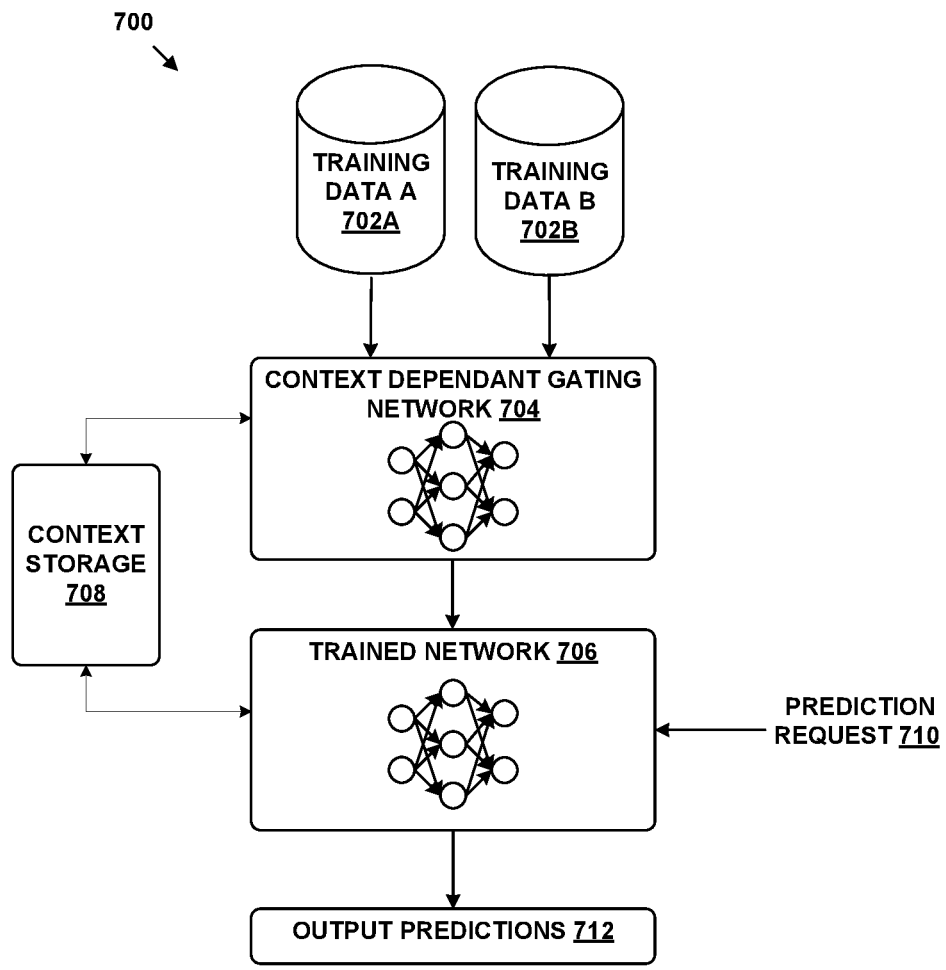
FIG. 7 illustrates a machine learning system, in accordance with example embodiments.

Example embodiments described above could be implemented in the context of a machine learning system, which could be constructed from one or more software, hardware, and/or firmware application programs configured for execution on a computing device, such as computing device 100, a server, or other form of computing system. FIG. 7 illustrates an example machine learning system 700, in accordance with example embodiments. Machine learning system 700 may use techniques as described herein to train an artificial neural network, such as ANN 200, to detect patterns and provide output predictions on a plurality of tasks. In example embodiments, components of machine learning system 700 may take the form of computing device 100 and/or database 114. Additionally, components of machine learning system 700 may be replicated across a plurality of computing devices and/or databases to provide data duplication and increase capability of services. For example, the computing devices and/or databases may be located at different physical locations to ensure availability in the event of failure at one location.

Training data 702A may include one or more databases designed to receive and store training data associated with task A and provide the training data to train context-dependent gating network 704. For example, training data 702A may include relational databases (e.g., SQL), key value databases (e.g., Redis), document databases (e.g., MongoDB), column databases (e.g., Cassandra) and/or other database models.

Training data 702B may include one or more databases designed to receive and store training data associated with task B and provide the training data to train context-dependent gating network 704. For example, training data 702B may include relational databases (e.g., SQL), key value databases (e.g., Redis), document databases (e.g., MongoDB), column databases (e.g., Cassandra) and/or other database models.

Context-dependent gating network 704 may include one or more processes that utilize machine learning techniques to train an ANN configured with gating and synaptic (or weight) stabilization, such as ANN 200 as described with respect to FIGS. 4A-4B, 5A-5B, and/or 6A-6B. In particular, context-dependent gating network 704 may be configured to be trained first with training data 702A and then with training data 702B. The resulting ANN may be referred to as a trained ANN 700. For example, machine learning system 700 illustrates context-dependent gating network 704 being trained on training data 702A and then training data 702B to become trained network 706. During runtime time, trained network 706 may receive prediction request 710 and responsively provide output predictions 712.

Context storage 708 may include one or more storage devices configured to store one or more gating tables/matrices associated with neurons on context-dependent gating network 704, such as those previously described with respect to FIGS. 5C-5D. For example, context storage 708 may take the form of a static file, a key-value database, or random access memory (RAM). In some cases, context-dependent gating network 704 and context storage 708 may be jointly implemented on a single computing device. At runtime time, context storage 708 may be utilized by trained network 706 to access gating table/matrices and identify whether to gate specific neurons when executing prediction request 710. By gating neurons, trained network 706 may provide prediction request 710 with an ANN structure that resembles the ANN structure used when training for the task associated with prediction request 710.

Prediction request 710 may include one or more input requests each associated with a task previously trained on context-dependent gating network 704. Each input request may include a feature vector and a context indication identifying the particular task associated with the input request. For example, context indication may be a one hot vector the size of the number of tasks previously trained on trained network 706, with the task being requested indicated as on (e.g., 1) and the rest of the tasks indicated as off (e.g., 0).

Output predictions 712 may include one or more inferences and/or predictions made by trained network 706 about prediction request 710. Output predictions 712 may be a single prediction or may be multiple predictions with likelihood probabilities associated with each of the multiple predictions.

VI. Example Methods

Example methods may be implemented as machine language instructions stored one or another form of the computer-readable storage, and accessible by the one or more processors of a computing device and/or system, and that, when executed by the one or more processors cause the computing device and/or system to carry out the various operations and functions of the methods described herein. By way of example, storage for instructions may include a non-transitory computer readable medium. In example operation, the stored instructions may be made accessible to one or more processors of a computing device or system. Execution of the instructions by the one or more processors may then cause the computing device or system to carry various operations of the example method.

Figure 8:
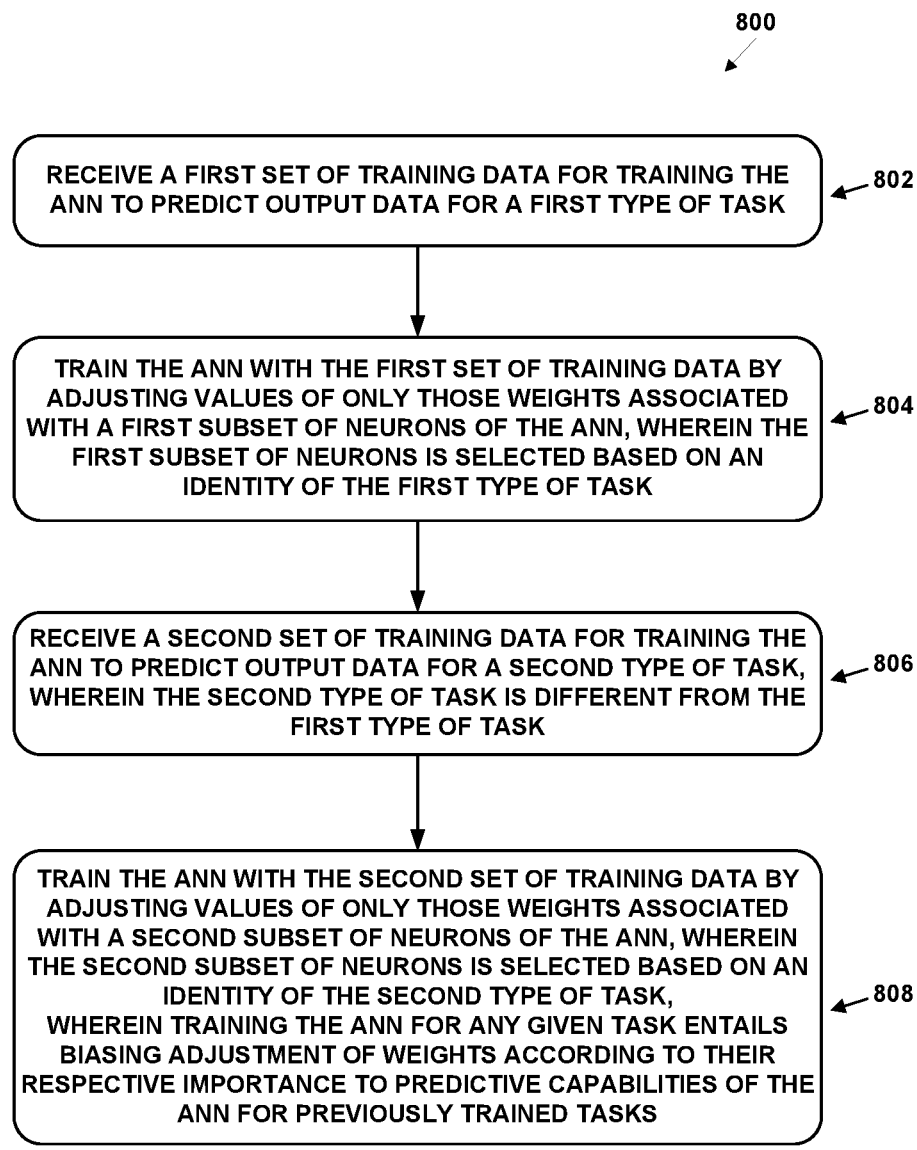
FIG. 8 is a flow chart of an example method, in accordance with example embodiments.

FIG. 8 is a flow chart of an example method 800, according to example embodiments. As described above, the example method could be implemented as machine language instructions stored, for example in the memory 104, and executed by the processor(s) 102. By way of example, the method 800 is described as being carried out by a computing device.

At step 802, the computing device receives a first set of training data for training the ANN to predict output data for a first type of task.

At step 804, the ANN is trained with the first set of training data by adjusting values of only those weights associated with a first subset of neurons of the ANN. The first subset of neurons is selected based on an identity of the first type of task.

At step 806, the computing device receives a second set of training data for training the ANN to predict output data for a second type of task, where the second type of task is different from the first type of task.

Finally, at step 808, the ANN is trained with the second set of training data by adjusting values of only those weights associated with a second subset of neurons of the ANN. The second subset of neurons is selected based on an identity of the second type of task.

In accordance with example embodiments, during training of the ANN for any given type of task, adjusting of the value of any given weight associated with neurons of the ANN entails weight stabilization that depends on whether there has been any training for one or more previous tasks. Specifically, if the ANN has been previously trained for one or more task types different from the given type, then adjusting of the value of any given weight associated with neurons of the ANN entails the computationally biasing adjustment of the value of the given weight according to a respective importance of the given weight to a predictive capability of the ANN for the one or more task types. If the ANN has not been previously trained for any task types different from the given type, then adjusting of the value of any given weight associated with neurons of the ANN entails computationally adjusting the value of the given weight without bias.

In some embodiments, selecting the first subset of neurons based on the identity of the first type of task includes consulting stored information that associates the first subset of neurons with the identity of the first type of task. Further, in such embodiments, selecting the second subset of neurons based on the identity of the second type of task includes consulting stored information that associates the second subset of neurons with the identity of the second type of task.

In some embodiments, the ANN comprises an input layer, an output layer, and one or more intermediate hidden layers. In such embodiments, each neuron of the ANN resides in one of the layers of the ANN, and selecting either one of the first subset of neurons or the second subset of neurons includes applying a gating table to the one or more intermediate hidden layers to pick out neurons according to either one of the first or second types of tasks. Further, in such embodiments, the gating table correlates neurons of the ANN with types of tasks, each entry in the gating table is a binary assignment of whether a neuron associated with the entry should be either active or gated for a particular type of task during training of the ANN.

In some embodiments, the binary assignment of whether a neuron should be either active or gated for the particular type of task during training of the ANN is based in part on a predefined optimal percentage of neurons to gate in the ANN for the particular type of task.

In some embodiments, the predefined optimal percentage is determined according to at least one of: the size of the ANN, the number of layers in the ANN, or the number of task types upon which the ANN is trained.

Some embodiments involve determining the gating table prior to training the ANN for any task types, where determining the gating table includes, for each type of task, randomly selecting neurons for gating.

In some embodiments, the gating table is a two-dimensional table. Each row of the gating table corresponds to a different one of multiple types of tasks, including the first and second types of tasks. Further, each column of the table corresponds to a different neuron from among the intermediate hidden layers of the ANN.

In some embodiments, the gating table is a three-dimensional table including a collection of like-sized two-dimensional gating matrices stacked in a third dimension that corresponds to types of tasks, including the first and second types of tasks. For each of the two-dimensional gating matrices: (i) each column corresponds to a different one of the one or more intermediate hidden layers of the ANN, and (ii) each row corresponds to a different neuron position within the intermediate hidden layers.

In some embodiments, adjusting the values of only those weights associated with the first subset of neurons of the ANN includes gating all neurons of the ANN during training for the first type of task except those of the first subset, where adjusting the values of only those weights associated with the second subset of neurons of the ANN includes gating all neurons of the ANN during training for the second type of task except those of the second subset. Further, in such embodiments, gating any given neuron during training includes computationally suppressing adjustment of weights associated with the given neuron during training.

In some embodiments, computationally suppressing adjustment of the weights associated with the given neuron during training includes at least one of: multiplying one or more inputs of the given neuron by zero, or multiplying one or more outputs of the given neuron by zero.

In some embodiments, computationally biasing adjustment of the value of the given weight according to the respective importance of the given weight to the predictive capability of the ANN for the one or more task types includes applying a penalty that computationally inhibits changing the value, the penalty increasing with increasing respective importance of the given weight to the predictive capability of the ANN for the one or more task types. Further, in such embodiments, computationally adjusting the value of the given weight without bias includes adjusting the value without applying any computational penalty.

In some embodiments, applying the penalty that computationally inhibits changing the value includes applying synaptic stabilization to the ANN during training.

Some embodiments involve, subsequent to training the ANN with both the first set of training data and the second set of training data; receiving runtime data associated with the first type of task; and applying the ANN to the runtime data associated with the first type of task to predict runtime output data for the first type of task, where only the first subset of neurons of the ANN are activated when applying the ANN to the runtime data associated with the first type of task. Such embodiments may further involve receiving runtime data associated with the second type of task and applying the ANN to the runtime data associated with the second type of task to predict runtime output data for the second type of task, where only the second subset of neurons of the ANN are activated when applying the ANN to the runtime data associated with the second type of task.

In some embodiments, subsequent to training the ANN with both the first set of training data and the second set of training data, a predictive accuracy of the ANN for the first type of task is higher than that of an alternatively-trained ANN trained, where alternative training comprises training for both the first type task and the second type of task without selecting either first or second subsets of neurons, and without biasing adjustment of any neurons.

VII. Representative Testing and Results

Example methods and systems above have been implemented by the inventors in one or more test environments and/or with one or more test beds in order to demonstrate practical aspects of the systems and techniques, as well as to evaluate efficiency and effectiveness of the techniques in alleviating catastrophic forgetting in ANNs trained for multiple tasks through multiple, sequential trainings. For at least some the testing, the publically-available Modified National Institute of Standards and Technology (MNIST) database served as test image data. This section summarizes some representative tests and results.

a. Synaptic Stabilization Approach

To demonstrate an ANN utilizing only synaptic stabilization, an ANN was trained on permutations of the MNIST task under two synaptic stabilization methods: "synaptic intelligence" (SI) and "elastic weight consolidation" (EWC). Mean classification accuracies for networks with EWC were 95.3% and 70.8% after 10 and 100 permutations, respectively, and mean classification accuracies for networks with synaptic intelligence were 97.0% and 82.3% after 10 and 100 permutations, respectively. Although both stabilization methods successfully mitigated forgetting, mean classification accuracy after 100 permutations was still far below single-task accuracy.

b. Context-Dependent Gating Approach

A context-dependent gating was tested for an ANN in which the activity of X % of hidden units, randomly chosen, was multiplied by 0 (gated), while the activity of the other (100-X) % was left unchanged. When context-dependent gating was used alone, mean accuracy was 97.1% after 10 tasks and 61.4% across all 100 permutations. However, when context-dependent gating was utilized together with synaptic intelligence or EWC, mean classification accuracy was 95.4% for both stabilization methods, greater than any of the discussed methods alone. For the permuted MNIST task, the mean classification accuracy peaked between 80% and 86.7% of units gated (values of 95.4% and 95.5%, respectively).

Utilizing context-dependent gating with synaptic stabilization allowed networks to learn 100 sequentially trained tasks with minimal loss in performance, with accuracy dropping from 98.2% on the first task to a mean of 95.4% across all 100 tasks. For 500 sequentially trained tasks, context-dependent gating used together with stabilization allowed for continual learning with only a gradual loss of accuracy over 500 tasks (context-dependent gating used together with synaptic intelligence=90.7%). In comparison, mean accuracy for stabilization alone decreased more severely (synaptic intelligence=54.9%).

VIII. Conclusion

Example embodiments herein demonstrate alleviating catastrophic forgetting in artificial neural networks (ANNs) using context-dependent gating of neurons of an ANN.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method, carried out by a computing device, for computationally training an artificial neural network (ANN) implemented in the computing device, the method comprising:
    at the computing device, receiving a first set of training data for training the ANN to predict output data for a first type of task;
    at the computing device, training the ANN with the first set of training data by adjusting values of only those weights associated with a first subset of neurons of the ANN, wherein the first subset of neurons is selected based on an identity of the first type of task;
    at the computing device, receiving a second set of training data for training the ANN to predict output data for a second type of task, wherein the second type of task is different from the first type of task; and
    at the computing device, training the ANN with the second set of training data by adjusting values of only those weights associated with a second subset of neurons of the ANN, wherein the second subset of neurons is selected based on an identity of the second type of task;
    wherein, during training of the ANN for any given type of task, adjusting of the value of any given weight associated with neurons of the ANN comprises:
        if the ANN has been previously trained for one or more task types different from the given type, computationally biasing adjustment of the value of the given weight according to a respective importance of the given weight to a predictive capability of the ANN for the one or more task types,
        and if the ANN has not been previously trained for any task types different from the given type, computationally adjusting the value of the given weight without bias.

2. The computer-implemented method of claim 1, wherein selecting the first subset of neurons based on the identity of the first type of task comprises consulting stored information that associates the first subset of neurons with the identity of the first type of task,
    and wherein selecting the second subset of neurons based on the identity of the second type of task comprises consulting stored information that associates the second subset of neurons with the identity of the second type of task.

3. The computer-implemented method of claim 1, wherein the ANN comprises an input layer, an output layer, and one or more intermediate hidden layers,
    wherein each neuron of the ANN resides in one of the layers of the ANN,
    and wherein selecting either one of the first subset of neurons or the second subset of neurons comprises applying a gating table to the one or more intermediate hidden layers to pick out neurons according to either one of the first or second types of tasks,
    wherein the gating table correlates neurons of the ANN with types of tasks,
    and wherein each entry in the gating table is a binary assignment of whether a neuron associated with the entry should be either active or gated for a particular type of task during training of the ANN.

4. The computer-implemented method of claim 3, wherein the binary assignment of whether a neuron should be either active or gated for the particular type of task during training of the ANN is based in part on a predefined optimal percentage of neurons to gate in the ANN for the particular type of task.

5. The computer-implemented method of claim 4, wherein the predefined optimal percentage is determined according to at least one of: a size of the ANN, a number of layers in the ANN, or a number of task types upon which the ANN is trained.

6. The computer-implemented method of claim 3, further comprising determining the gating table prior to training the ANN for any task types, wherein determining the gating table comprises: for each type of task, randomly selecting neurons for gating.

7. The computer-implemented method of claim 3, wherein the gating table is a two-dimensional table,
    and wherein: (i) each row of the gating table corresponds to a different one of multiple types of tasks, including the first and second types of tasks, and (ii) each column of the table corresponds to a different neuron from among the intermediate hidden layers of the ANN.

8. The computer-implemented method of claim 3, wherein the gating table is a three-dimensional table comprising a collection of like-sized two-dimensional gating matrices stacked in a third dimension that corresponds to types of tasks, including the first and second types of tasks,
    and wherein, for each of the two-dimensional gating matrices: (i) each column corresponds to a different one of the one or more intermediate hidden layers of the ANN, and (ii) each row corresponds to a different neuron position within the intermediate hidden layers.

9. The computer-implemented method of claim 1, wherein adjusting the values of only those weights associated with the first subset of neurons of the ANN comprises gating all neurons of the ANN during training for the first type of task except those of the first subset,
    and wherein adjusting the values of only those weights associated with the second subset of neurons of the ANN comprises gating all neurons of the ANN during training for the second type of task except those of the second subset,
    wherein gating any given neuron during training comprises computationally suppressing adjustment of weights associated with the given neuron during training.

10. The computer-implemented method of claim 9, wherein computationally suppressing adjustment of the weights associated with the given neuron during training comprises at least one of: multiplying one or more inputs of the given neuron by zero, or multiplying one or more outputs of the given neuron by zero.

11. The computer-implemented method of claim 1, wherein computationally biasing adjustment of the value of the given weight according to the respective importance of the given weight to the predictive capability of the ANN for the one or more task types comprises applying a penalty that computationally inhibits changing the value, the penalty increasing with increasing respective importance of the given weight to the predictive capability of the ANN for the one or more task types,
    and wherein computationally adjusting the value of the given weight without bias comprises adjusting the value without applying any computational penalty.

12. The computer-implemented method of claim 11, wherein applying the penalty that computationally inhibits changing the value comprises applying synaptic stabilization to the ANN during training.

13. The computer-implemented method of claim 1, further comprising:
    subsequent to training the ANN with both the first set of training data and the second set of training data:
        receiving runtime data associated with the first type of task;
        applying the ANN to the runtime data associated with the first type of task to predict runtime output data for the first type of task, wherein only the first subset of neurons of the ANN are activated when applying the ANN to the runtime data associated with the first type of task;
        receiving runtime data associated with the second type of task; and
        applying the ANN to the runtime data associated with the second type of task to predict runtime output data for the second type of task, wherein only the second subset of neurons of the ANN are activated when applying the ANN to the runtime data associated with the second type of task.

14. The computer-implemented method of claim 1, wherein subsequent to training the ANN with both the first set of training data and the second set of training data, the predictive capability of the ANN for the first type of task is higher than that of an alternatively-trained ANN trained, wherein alternative training comprises training for both the first type task and the second type of task without selecting either first or second subsets of neurons, and without biasing adjustment of any neurons.

15. A computing device comprising:
    one or more processors; and
    memory configured to store computer-executable instructions that, when executed by the one or more processors, cause the computing device to carry out operations including:
        receiving a first set of training data for training an artificial neural network (ANN) implemented on the one or more computing devices to predict output data for a first type of task;
        training the ANN with the first set of training data by adjusting values of only those weights associated with a first subset of neurons of the ANN, wherein the first subset of neurons is selected based on an identity of the first type of task;
        receiving a second set of training data for training the ANN to predict output data for a second type of task, wherein the second type of task is different from the first type of task; and
        training the ANN with the second set of training data by adjusting values of only those weights associated with a second subset of neurons of the ANN, wherein the second subset of neurons is selected based on an identity of the second type of task;
        wherein, during training of the ANN for any given type of task, adjusting of the value of any given weight associated with neurons of the ANN comprises:
            if the ANN has been previously trained for one or more task types different from the given type, computationally biasing adjustment of the value of the given weight according to a respective importance of the given weight to a predictive capability of the ANN for the one or more task types,
            and if the ANN has not been previously trained for any task types different from the given type, computationally adjusting the value of the given weight without bias.

16. The computing device of claim 15, wherein selecting the first subset of neurons based on the identity of the first type of task comprises consulting stored information that associates the first subset of neurons with the identity of the first type of task,
    and wherein selecting the second subset of neurons based on the identity of the second type of task comprises consulting stored information that associates the second set of neurons with the identity of the second type of task.

17. The computing device of claim 15, wherein the ANN comprises an input layer, an output layer, and one or more intermediate hidden layers,
    wherein each neuron of the ANN resides in one of the layers of the ANN,
    and wherein selecting either one of the first subset of neurons or the second subset of neurons comprises applying a gating table to the one or more intermediate hidden layers to pick out neurons according to either one of the first or second types of tasks,
    wherein the gating table correlates neurons of the ANN with types of tasks,
    and wherein each entry in the gating table is a binary assignment of whether a neuron associated with the entry should be either active or gated for a particular type of task during training of the ANN.

18. The computing device of claim 17, wherein the binary assignment of whether a neuron should be either active or gated for the particular type of task during training of the ANN is based in part on a predefined optimal percentage of neurons to gate in the ANN for the particular type of task.

19. The computing device of claim 15, wherein adjusting the values of only those weights associated with the first subset of neurons of the ANN comprises gating all neurons of the ANN during training for the first type of task except those of the first subset,
    and wherein adjusting the values of only those weights associated with the second subset of neurons of the ANN comprises gating all neurons of the ANN during training for the second type of task except those of the second subset,
    wherein gating any given neuron during training comprises computationally suppressing adjustment of weights associated with the given neuron during training.

20. An article of manufacture comprising non-transitory computer readable media having computer-readable instructions stored thereon that, when executed by one or more processors of a computing device, cause the computing device to carry out operations including:
    receiving a first set of training data for training an artificial neural network (ANN) implemented on the one or more computing devices to predict output data for a first type of task;
    training the ANN with the first set of training data by adjusting values of only those weights associated with a first subset of neurons of the ANN, wherein the first subset of neurons is selected based on an identity of the first type of task;
    receiving a second set of training data for training the ANN to predict output data for a second type of task, wherein the second type of task is different from the first type of task; and
    training the ANN with the second set of training data by adjusting values of only those weights associated with a second subset of neurons of the ANN, wherein the second subset of neurons is selected based on an identity of the second type of task;

wherein, during training of the ANN for any given type of task, adjusting of the value of any given weight associated with neurons of the ANN comprises:
- if the ANN has been previously trained for one or more task types different from the given type, computationally biasing adjustment of the value of the given weight according to a respective importance of the given weight to a predictive capability of the ANN for the one or more task types, and if the ANN has not been previously trained for any task types different from the given type, computationally adjusting the value of the given weight without bias.

* * * * *